United States Patent
Ponniah et al.

(10) Patent No.: US 11,475,456 B2
(45) Date of Patent: Oct. 18, 2022

(54) DIGITAL CONTENT AND TRANSACTION MANAGEMENT USING AN ARTIFICIAL INTELLIGENCE (AI) BASED COMMUNICATION SYSTEM

(71) Applicant: ACCENTURE GLOBAL SOLUTIONS LIMITED, Dublin (IE)

(72) Inventors: Ramakrishnan Ponniah, Chennai (IN); Rehan Guha, Kolkata (IN); G. B. Balasundaram, Thiruvarur (IN); Vijay Mahalingam, Chennai (IN); Freeda Kanickairaj, Chennai (IN)

(73) Assignee: ACCENTURE GLOBAL SOLUTIOS LIMITED, Dublin (IE)

( * ) Notice: Subject to any disclaimer, the term of this patent is extended or adjusted under 35 U.S.C. 154(b) by 152 days.

(21) Appl. No.: 16/167,111

(22) Filed: Oct. 22, 2018

(65) Prior Publication Data
US 2020/0034842 A1      Jan. 30, 2020

(30) Foreign Application Priority Data

Jul. 24, 2018 (IN) .............................. 201811027773

(51) Int. Cl.
*G06Q 20/40* (2012.01)
*G06Q 40/02* (2012.01)

(52) U.S. Cl.
CPC ....... *G06Q 20/407* (2013.01); *G06Q 20/4016* (2013.01); *G06Q 40/025* (2013.01)

(58) Field of Classification Search
CPC .............................................. G06Q 20/4016
See application file for complete search history.

(56) References Cited

U.S. PATENT DOCUMENTS 8,458,090 B1    6/2013  Batra et al.
10,475,033 B2 *  11/2019  Mankad ............. G06Q 20/4016
(Continued)

OTHER PUBLICATIONS

"Predictive Analytics", Wikipedia, retrieved from the Internet on Aug. 12, 2020, 12 pages. <https://en.wikipedia.org/wiki/Predictive_analytics>.

(Continued)

*Primary Examiner* — Jay Huang
(74) *Attorney, Agent, or Firm* — Mannava & Kang, P.C.

(57) ABSTRACT

A system for predicting a non-fraud dispute using an artificial intelligence (AI) based communications system is disclosed. The system may comprise a data access interface to receive instructions historical transaction and disputes data from at least one data source associated with an account issuer. The data access interface may also receive incoming transaction data associated with a transaction from at least one data source associated with an account holder. The system may comprise a processor to predict a likelihood of a non-fraud dispute associated with the transaction by: examining the historical transaction and disputes data; retrieving non-fraud dispute attributes; parsing the incoming transaction data; applying predictive analytics to the incoming transaction data to yield a prediction value; determining that the prediction value meets a predetermined threshold; and generating a prediction for the likelihood of a non-fraud dispute associated with the transaction associated with the account holder to be outputted, via an output interface to a user device.

16 Claims, 17 Drawing Sheets

(56) References Cited

U.S. PATENT DOCUMENTS

| | | | |
|---|---|---|---|
| 10,552,837 B2* | 2/2020 | Jia | G06N 20/00 |
| 10,825,012 B1* | 11/2020 | Senci | G06Q 20/407 |
| 2006/0218192 A1* | 9/2006 | Gopalakrishnan | G06F 16/48 |
| 2010/0114899 A1* | 5/2010 | Guha | G06F 16/9535 |
| | | | 707/E17.089 |
| 2011/0196791 A1 | 8/2011 | Dominguez | |
| 2015/0032617 A1* | 1/2015 | Ganis | G06Q 20/4016 |
| | | | 705/44 |
| 2015/0052050 A1 | 2/2015 | Mankad et al. | |
| 2015/0193775 A1 | 7/2015 | Douglas et al. | |
| 2017/0053278 A1 | 2/2017 | Gerard et al. | |
| 2017/0213280 A1 | 7/2017 | Kaznady | |
| 2017/0286962 A1* | 10/2017 | Lai | G06Q 20/407 |
| 2018/0060839 A1* | 3/2018 | Murali | G06Q 40/02 |
| 2019/0164159 A1* | 5/2019 | Ponniah | G06Q 20/405 |
| 2019/0392538 A1* | 12/2019 | So | G06Q 30/04 |

OTHER PUBLICATIONS

Randhawa et al., Credit Card Fraud Detection Using AdaBoost and Majority Voting. (2018) IEEE Access. pp. 1-1. 10.1109/ACCESS.2018.2806420.

* cited by examiner

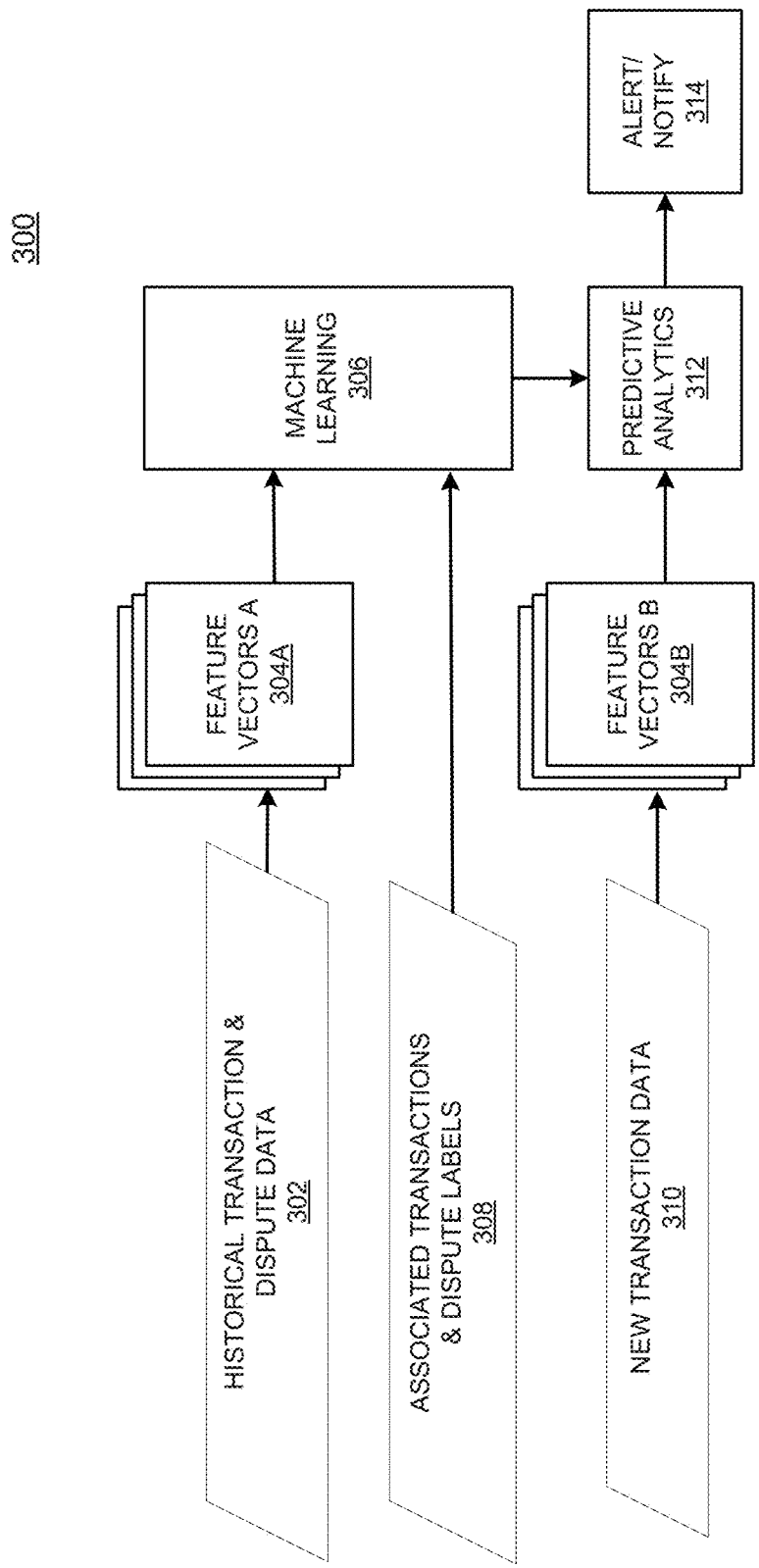

DIGITAL CONTENT AND TRANSACTION MANAGEMENT USING AN ARTIFICIAL INTELLIGENCE (AI) BASED COMMUNICATION SYSTEM

PRIORITY

The present application claims priority under 35 U.S.C. 119(a)-(d) to Indian patent application number 201811027773, having a filing date of Jul. 24, 2018, the disclosure of which is hereby incorporated by reference in its entirety.

TECHNICAL FIELD

This patent application relates generally to artificial intelligence (AI) based communication systems, and more specifically, to systems and methods for digital content and transaction management using artificial intelligence (AI) based communication with machine learning and predictive analytics.

BACKGROUND

Cyberattacks and data breaches are becoming a more serious threat to individuals, organizations, and overall society. The number of attacks is also increasing at a rapid rate. Several conventional approaches have been used to combat data security problems. Disk encryption in hardware and software, such as on-the-fly encryption (OTFE) or transparent encryption, involves converting data to an unreadable or otherwise inaccessible format. Data masking or data obfuscation is used to "hide" data. Masking is achieved by inserting random characters in data fields to mislead and prevent sensitive data from being accessed by unauthorized personnel. Backups are used for recovery of data to help restore data in the event of data corruption or erasure. These and other techniques are used to help minimize impact of cyberattacks or data breaches.

Many of these cyberattacks or data breaches may also involve some measure of fraud, making fraud detection more important than ever. Some techniques for fraud detection may include the use of data mining or statistics. While these innovations have helped to reduce and mitigate risk, an accurate and reliable way to identify or predict fraudulent activity remains a challenge. For example, there are many scenarios where conventional systems confuse fraudulent activity with non-fraudulent ones. While many organizational entities abide by the mantra that it is better to be safe than sorry, too many non-fraud disputes, however, are treated the same way as potential fraud disputes, ultimately creating undesirable inefficiencies and increased customer dissatisfaction caused by poor user experience. With increased globalization where large volumes of data and digital transactions are taking place at a rapid rate, it has become even more difficult to monitor exchange of data and potential warning signs of fraud, and differentiating non-fraud activities from real fraud. In fact, a majority of customer complaints are comprised of non-fraud billing disputes that could be more easily managed, creating more energy, time, and resources for other more important organizational pursuits.

Accordingly, a more robust approach for digital content and transaction management using artificial intelligence (AI) based communication with machine learning and predictive analytics may be provided.

BRIEF DESCRIPTION OF DRAWINGS

Features of the present disclosure are illustrated by way of example and not limited in the following Figure(s), in which like numerals indicate like elements, in which:

FIG. 3 illustrates a block diagram for machine learning processing in an artificial intelligence (AI) based communication system, according to an example;

FIGS. 6A-6K illustrate screens for digital content and transaction management using artificial intelligence (AI) based communication with machine learning predictive analytics, according to an example.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, cyberattacks or data breaches are becoming a serious problem in the world. Many of these attacks or situations involve some measure of fraud, making fraud detection more important than ever. However, there are many scenarios where conventional systems confuse fraudulent activity with non-fraudulent ones. In fact, the majority of complaints by payment cardholders is not fraud disputes or issues of identity theft, as one would assume. Rather, the majority of complaints are mostly that of non-fraud billing disputes. In other words, conventional systems and techniques lack focus, are ill-equipped, or simply unintelligent in addressing the predominant issue in current digital content transactions and the issues that plague financial institutions and their customers.

Accordingly, technical challenges facing digital content and transaction management may abound. For example, these may include creating and developing a system that: meets the growing demand for intelligent banking (or other) services, reduces resolution cycles for non-fraud disputes, and reduces high operational costs associated with such disputes. The AI-based communications systems described herein may overcome these shortcomings by providing more proactive personalized care, insightful customer service, and reduction of actual non-fraud disputes using more intelligent systems that leverage machine learning and predictive analytics.

As described herein, improved techniques for artificial intelligence (AI) based communications system may reduce dispute resolution cycles, enhance customer experience, and provide a more proactive (rather than reactive) technique to digital content and transaction management. Ultimately, this may build customer trust, cut costs, and provide greater flexibility and management of time and resources.

Figure 1:
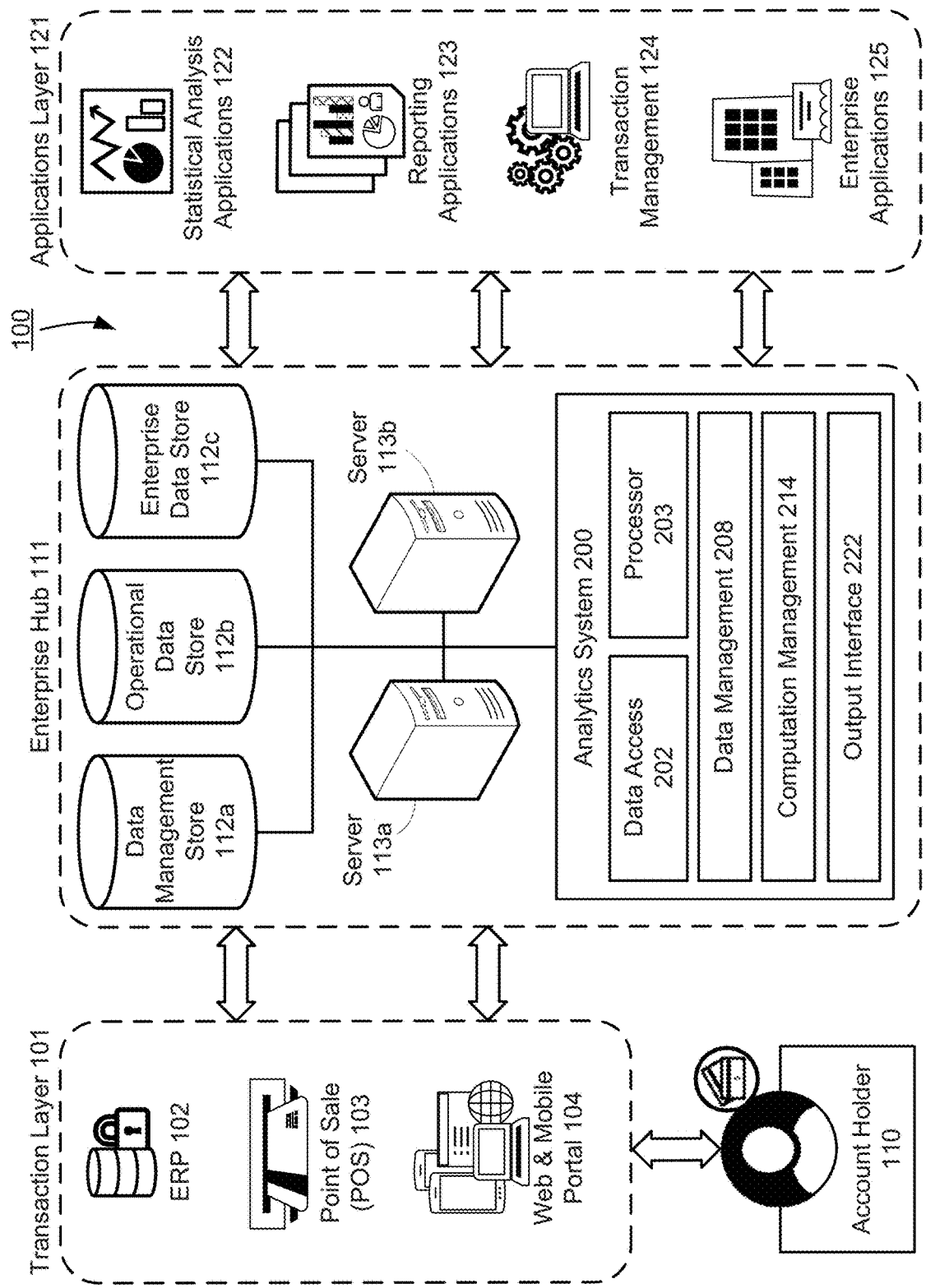
FIG. 1 illustrates an artificial intelligence (AI) based communications system for digital content and transaction management, according to an example.

FIG. 1 illustrates an artificial intelligence (AI) based communications system 100 for digital content and transaction management, according to an example. The AI-based communications system 100 may be used to provide intelligent digital content and transaction management. In particular, the AI-based communications system 100 may provide ability for an enterprise, such as a financial institution or bank, to proactively predict and alert its customers when a transaction is prone to potential non-fraud billing disputes, and to provide a way to resolve such issues earlier along in a transaction process. The AI-based communications system 100 may store information or be able to receive information from various data sources, as well as leverage artificial intelligence and other related machine learning techniques to better predict potential non-fraud disputes when monitoring digital content and transactions. For example, the AI-based communications system 100 may use machine learning techniques, predictive analytics, simulation and modeling, intelligent forecasting, as well as other techniques, such as natural language processing, interactive user interface, multi-lingual support, smart integration, visual/audio support, and/or other AI-based techniques.

The AI-based communications system 100 may operate in a network or an enterprise environment where data is exchanged, and where transactions are being made by customers. More specifically, the AI-based communications system 100 may provide real-time or near real-time monitoring and analysis of data exchange and storage, as well as various customer transactions (e.g., financial). The enterprise environment of the AI-based communications system 100 may include a transaction layer 101, with which an account holder 110 may interact, an enterprise hub 111, and an applications layer 121. The account holder 110 may be a customer or card holder of an organization entity (e.g., financial institution) that manages the enterprise hub 111 or various systems or components of the AI-based communications system 100, including those of the transaction layer 101 and/or applications layer 121.

The transaction layer 101 may include systems, subsystems, applications, and/or interfaces to collect information from enterprise resource planning (ERP) systems and applications 102 (hereinafter "ERP"), point of sale (POS) 103, and web and mobile portal 104, all of which may be distinct or integrated with the AI-based communications system 100. The transaction layer 101 may include other source of data or transaction information as well. It should be appreciated that each of these data and/or transaction sources may further include its own data feed, storage, system, application, or other source for collecting and sending data and information, including third party or indirect sources.

The ERP 102 may include one or more application servers that host various ERP applications. These may include, for example, a customer relationship management (CRM) platform, system, or application. The ERP 102 may collect, store, manage, and interpret data associated with various enterprise functions or activities. The ERP 102 may provide an integrated and continuously updated view of core business processes using common databases maintained by a database management system. The ERP 102 may track enterprise resources (e.g., cash, raw materials, production capacity, etc.) as well as other information, such as corporate or business transactions (e.g., orders, purchase orders, payroll, ticketing, etc.). Furthermore, the applications that make up the ERP 102 may share data across various departments (e.g., manufacturing, purchasing, sales, accounting, etc.) that provide the data. The ERR 102 may facilitate information flow between many enterprise functions and may manage communications with stakeholders or other outside parties. As a result, the ERP 102 may contain large quantities of information and data associated with a company, its employees, as well as a history of data exchanged and transactions.

The point of sale (POS) 103 may provide ability to conduct transactions, as well as a source of data and/or information about various transactions. A point of sale (POS) 103 may include any machine or system that processes payments from a customer (e.g., account holder 110). The point of sale (POS) 103 may include cash registers or various computing devices that facilitate payment transactions. These systems may also include cash drawers, receipt printers, barcode scanners or cameras, card machines (e.g., that use magnetic, RFID, chip, or other technology), and/or various network devices. In addition to payment transactions, other transactions may be facilitated by a point of sale (POS) 103. These may include tasks such as data entry, inventory management, customer marketing, exchanges and returns, reporting, and/or other transactions-related processing and management functions.

Point of sale (POS) technology has evolved with recent advancements in mobile and computing technologies. Accordingly, the web and mobile portal 104 may also function as a point of sale (POS) system and may be therefore another source of data and/or transaction information. The web and mobile portal 104 may be accessed via any Internet-based or mobile device based systems or applications of various users. In an example, web and mobile portal 104 may be accessed by a customer via a mobile device (e.g., smart phone or tablet, digital wallet, etc.). These may also include automated teller machine (ATM) machines or kiosks, or any other Internet-based transaction payment channel. In addition to payment processing, the web and mobile portal 104 may also facilitate exchange of various data. These may include exchange of data associated with a transaction, such as digital documents, which may include files, emails, faxes, scans, or other documents that are transmitted, received, and stored in an enterprise environment.

Data received at the web and mobile portal 104 may also include data from various web sources, such as websites, social media, syndication, aggregators, or from scraping. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

Data received at the web and mobile portal 104 may also include machine and sensor data associated with an enterprise and/or its members, customers, clients, partners, or account holders. For example, in an enterprise network, there may be physical devices, vehicles, appliances, and other enterprise systems that are equipped with electronics, software, and sensors, where most, if not all, of these items are within a network and share some measure of connectivity which enable these and other pieces of equipment to connect, communicate, and exchange data. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc.

By creating a "smarter" environment and leveraging interactivity between various pieces of equipment in an enterprise network, the data received by the web and mobile portal 104 may provide significant amounts of information and data that can be collected. Together with other technologies and systems, such data may help enable the AI-based communications system 100 provide a more efficient way to monitor digital content and transaction processing/management.

The machine and sensor data may also include geolocation data that includes information or data associated with identification or estimation of real-world geographic location of an object, such as a radar source, mobile device, or web-based computer or processing device. Geolocation data may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data in the transaction layer 101 may be collected, monitored, analyzed, and/or incorporated with digital content and transaction processing/management.

The enterprise hub 111 may collect, manage, process, and analyze information and data from the transaction layer 101 and the applications layer 121. The enterprise hub 111 may be within general control of an enterprise, such as an organizational entity conducting operations, business, or other related activities. In an example, the enterprise may be a financial institution having many customers or account holders 110 who are able to conduct a variety of transactions using funds form their financial accounts. The enterprise hub 111 may provide an AI-based system that provides predictive analytics, pattern recognition, machine learning, and other AI-based techniques to collect, manage, process, and analyze information and data from the transaction layer 101 and the applications layer 121. For example, the enterprise may provide proactive prediction of non-fraud disputes and help reduce association operational costs related to resources dedicated to resolving these disputes.

In order to do this, the enterprise hub 111 may include one or more data stores, one or more servers, and other elements to process data for its organizational purposes. For example, the enterprise hub 111 may include a data management store 112a, an operational data store 112b, and an enterprise data store 112c. The data management store 112a may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource. In an example, data associated with transactions, disputes histories, account systems, customers, partners, account holders, authentication, etc. may also be stored in the data management store 112a.

The operational data store 112b may store information and data associated with operational reporting, controls, and decision-making. The operational data store 112b may be designed to integrate data from multiple sources for additional operations on that data, for example, in reporting, controls, and operational decision support. Integration of data at the operational data store 112b may involve cleaning, resolving redundancy, checking against business rules, and other data integration techniques, such as data virtualization, federation, and extract, transform, and load (ETL). The operational data store 112b may also be a source of data for an enterprise data store 112c, which may be used for tactical and strategic decision support.

The enterprise data store 112c may store information and data associated with reporting and data analysis, and may be instrumental to various business intelligence functions. For example, the enterprise data store 112c may be one or more repositories of integrated data (e.g., from the operational data store 112b) and used to store current and historical data and to create analytical report(s) for advanced enterprise knowledge. Data passed through the enterprise data store 112c may also involve cleansing to ensure data quality and usage. ETL may also be used, as well as other techniques, involving staging, data integration, and access features. Ultimately, data in the enterprise data store 112c may be transformed and catalogued so that it may be used for data mining, analytics, and other business intelligence purposes, such as marketing, decision support, etc. Other data stores may also be provided in the enterprise hub 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The enterprise hub 111 may further include a variety of servers 113a and 113b that facilitate, coordinate, and manage information and data. For example, the servers 113a and 113b, as well as others described herein, may include any number or combination of the following servers: exchange servers, content management server, application servers, database servers, directory servers, web servers, security servers, enterprise servers, and analytics servers. Other servers to provide data security and protection may also be provided.

The enterprise hub 111 may also include an analytics system 200. The analytics system 200 may include various layers, processors, systems or subsystems. For example, the analytics system 200 may include a data access interface 202, a processor 203, a data management subsystem 208, a computation management subsystem 214, and an output interface 222. Other layers, processing components, systems or subsystems, or analytics components may also be provided. It should be appreciated that the data management 208 and computation management 214 may be other processing components integrated or distinct from processor 203 to help facilitate data processing, especially for digital content and transaction management, by the analytics system 200 as described herein. Features and functionalities may be particularly helpful in transaction management and machine learning.

There may be many examples of hardware that may be used for any of the servers, layers, subsystems, and components of the analytics system 200 or the AI-based communications system 100 described herein. For example, the processor 203 may be an integrated circuit, and may execute software or firmware or comprise custom processing circuits, such as an application-specific integrated circuit (ASIC) or field-programmable gate array (FPGA). The data access interface 202 and output interface 222 may be any number of hardware, network, or software interfaces that serves to facilitate communication and exchange of data between any number of or combination of equipment, protocol layers, or applications. For example, the data access interface 202 and output interface 222 may each include a network interface to communicate with other servers, devices, components or network elements via a network in the AI-based communications system 100. More detail of the analytics system 200 is provided in FIG. 2.

The AI-based communications system 100 may also include an applications layer 121. The applications layer 121 may include any number or combination of systems and applications that interface with users or user-interfacing tools in an enterprise or a personal environment. For example, the applications layer 121 may include statistical analysis applications 122, reporting applications 123, transaction management 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, State®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The transaction management 124 may include any systems or applications that monitors, tracks, and logs various transactions, namely those in an enterprise environment and/or its customers. In an example, these may include financial transactions and related functions. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, the transaction management 124 or enterprise applications 125 may be integrated or external/remote to the enterprise hub 111.

It should be appreciated that a layer as described herein may include a platform and at least one application. An application may include software comprised of machine-readable instructions stored on a non-transitory computer readable medium and executable by a processor. The systems, subsystems, and layers shown in FIG. 1 or other figure may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the servers 113a and 113b, and/or other servers within the systems, layers, and subsystems of the AI-based communications system 100, as described herein. However, it should be appreciated that multiple servers may be used for each of these servers, and the servers may be connected via one or more networks. Also, middleware (not shown) may include in the AI-based communications system 100 as well. The middleware may include software hosted by one or more servers, or it may include a gateway or other related element. Furthermore, it should be appreciated that some of the middleware or servers may or may not be needed to achieve functionality. Other types of servers, middleware, systems, platforms, and applications not shown may also be provided at the back-end to facilitate the features and functionalities of the AI-based communications system 100.

The AI-based communications system 100, as described herein, may provide several benefits and advantages over conventional techniques. For example, the AI-based communications system 100 may leverage power of artificial intelligence and other features to provide users with a "smarter" way to predict potential non-fraud disputes before they occur. The AI-based communications system 100 may also provide a more streamlined and proactive approach to non-fraud dispute resolution, which in turn enhances overall customer experience as well as reduce costs and resources associated with resolving such disputes. The AI-based communications system 100 may also provide more insightful reporting that employs analytical capabilities and services. The AI-based communications system 100 may also provide alert or notification, as well as continuous self-learning to provide more accurate and precise predictions.

The AI-based communications system 100 may be platform independent. In other words, the AI-based communications system 100 may be created and/or deployed across various platforms, such as Windows, MAC, Unix, or other operating systems. In addition, the AI-based communications system 100 may also be hosted in the cloud, provisioned/accessed via the web, or provided locally/remotely via on-site premises. In cloud environments, for example, the AI-based communications system 100 may use APIs that provide customers and enterprises with consistent interactive look and feel, ensuring high levels of user experience and familiarity. In addition, smart integration may provide holistic solution agnostic to various payment networks or systems (e.g., VISA, MasterCard, AMEX, etc.

Within the AI-based communications system 100, there may be a large amount of data that is exchanged, and the exchanged data may sensitive or personal. With new laws and regulations surrounding sensitive personal data in possession by organizational entities, the AI-based communications system 100 described herein may also provide a more robust approach to handle and process potentially sensitive personal data, as is required.

The General Data Protection Regulation (GDPR), for example, is a new regulation recently passed by the European Parliament (EP), the Counsel of the European Union (EU), and the European Commission (EC) in order to strengthen and unify data protection for individuals within the EU. The GDPR specifically addresses the export of personal data outside of the EU and aims to give control back to citizens and residents over their personal data, as well as to simplify the regulatory environment for international business. These and other new laws are having an impact to companies, organizations, and entities that are entrusted or in possession of private or personal data. In order to comply with these new laws and regulations, such as the GDPR, organizational entities may need to understand what data and information they possess, why they possess it, and the potential sensitivity of that that data. The AI-based communications system 100, as described herein, may therefore provide a more dynamic and scientific approach to provide monitoring, diagnostics, and analytics to using and processing such potential sensitive data in an enterprise network.

Ultimately, the AI-based communications system 100 may provide a more robust and comprehensive approach for artificial intelligence (AI) based communications system that provides accurate predictions of potential transaction disputes (e.g., non-fraud disputes), greater user control and accessibility, and a more intelligent and proactive approach to dispute resolution that reduces costs and inefficiencies.

Figure 2:
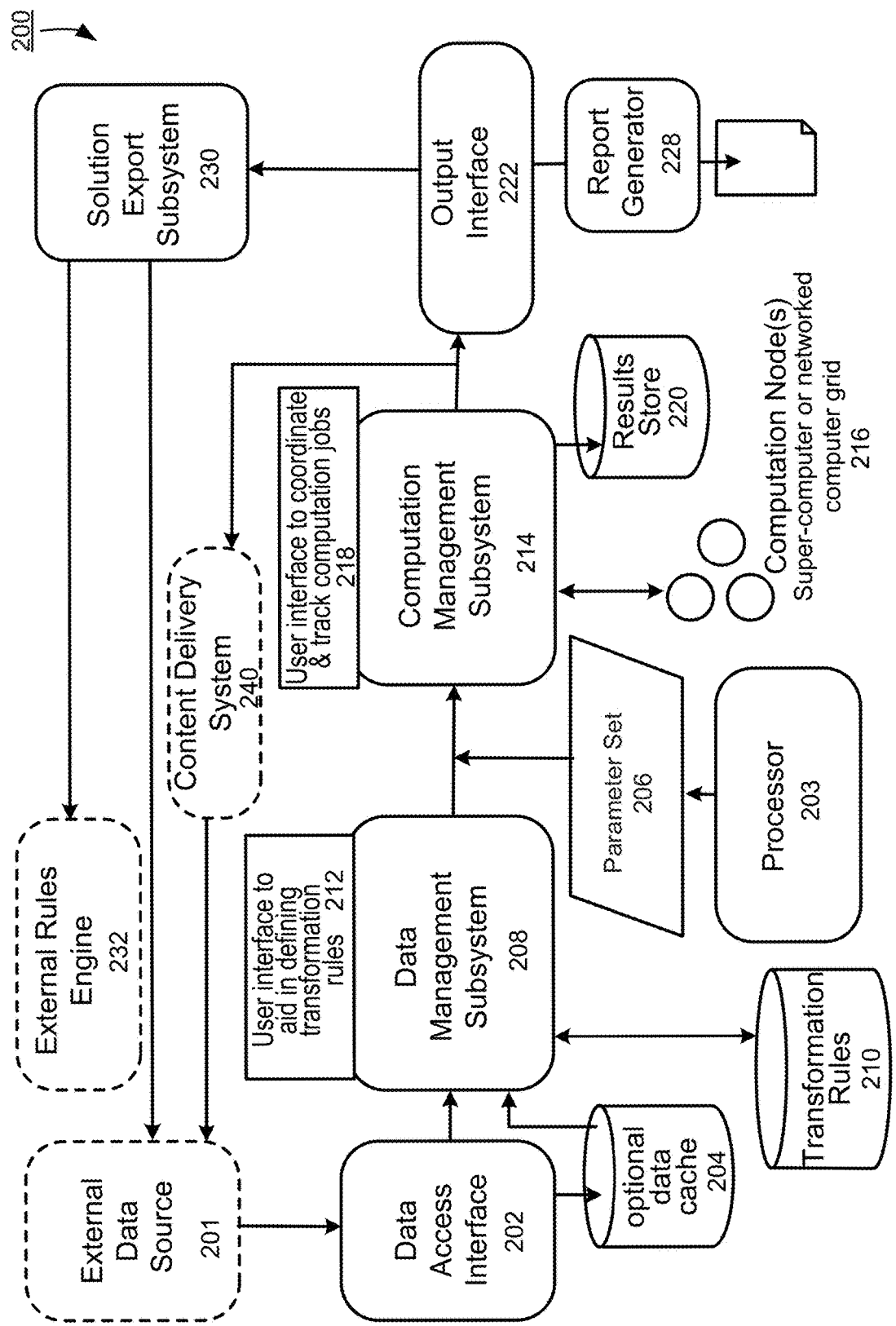
FIG. 2 illustrates an example of components in an analytics system, according to an example.

FIG. 2 illustrates an example of components in an analytics system 200, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may provide customer or product support using account management and predictive analytics. In an example, the analytics system 200 may be an integrated system as part of the enterprise hub 111 shown in FIG. 1.

In the example of FIG. 2, data may be accessed from an external data source 201 by a data access interface 202. The external data source 201 may be any data source from the data source layer 101, the account holder 110, enterprise hub 111, and applications layer 121 of the AI-based communications system 100 of FIG. 1, as well as other data sources not depicted. The data access interface 202 may optionally store some or all (or none) of the data in an optional data cache 204, which may be local or remote. The imported data may then be passed to a data management subsystem 208 for processing prior to performing analytics. For example, the data management subsystem 208 may organize the data by grouping, ordering, transforming, or cleaning the data in such a way that facilitates input of the data into analytics processing. The data management subsystem 208 may use one or more transformation rules that specify one or more rules to apply to the data for processing. In an example, the transformation rules may be accessed from storage (e.g., from data store 210). Additionally or alternatively, the transformation rules may be input by a user. For example, the data management subsystem 208 may provide a user interface 212 to a user that enables the user to specify one or more transformation rules. The data management subsystem 208 may also implement data management without rules (e.g., non-rule-based) and rely on other data management schemes.

The data management subsystem 208 may identify different types of variables that are specified by the user, and separate the variables according to the identified type. Some types of variables may be used as inputs to the analytics process, while other types of variables may be used as evaluation criteria to evaluate the resulting analytics solutions. As such, the system may enable not only automated processing of data, but also automated evaluation of the resulting analytics solutions.

In an example involving clustering, the analytics system 200 may separate variables in the data across three distinct types: Target Drivers, Cluster Candidates, and Profile Variables. Target Drivers may be factors that are for driving the success of a business, such as revenue, profitability, potential value of a customer, costs, etc. In some cases, there may be no more than two or three target drivers. Cluster Candidates may be attributes that are readily available that may be used to partition the overall population. These may describe the population and may be significantly different from the business drivers. Profile Variables may be other factors that are not assigned as cluster candidates or target drivers. Profile variables may not be immediately actionable (the data may not be easily accessible or may be found only after a period of lime) or they may be too much of a restatement of the business drivers.

The variables determined by the data management subsystem 208 and a parameter set 206 generated by the processor 203 may be provided to the computation management subsystem 214. The computation management subsystem 214 may send the processed data including the parameter set 206 and one or more chosen clustering algorithms to one or more computational nodes 216 to perform clustering operations. The clustering operations may identify several (e.g., thousands or millions) different cluster solutions, each including a plurality of clusters of the data.

The computation management subsystem 214 may evaluate generated cluster solutions based on user-specified criteria, and iterate through multiple sets of cluster solutions to identify cluster solutions that satisfy the criteria. The computation management subsystem 214 may identify also apply one or more generalized heuristic supervised learning algorithms to the computation process to improve the efficiency of the solution search, based on the cluster solutions generated by the computational nodes 216. The supervised learning algorithms may utilize target driver variables specified by the user to facilitate searching for particular cluster solution(s), among the potentially many cluster solutions generated by the computation nodes 216, that are meaningful to the user. The computation management subsystem 214 may also provide a user interface 218 that shows the user the progress of the clustering and shows cluster solutions.

The computation management subsystem 214 may also provide a user interface 212 that shows the user the progress of the clustering and shows cluster solutions. The user interface may be an output interface 222, like that shown in FIG. 1, which may in turn include a visualization interface that may show cluster solution(s) and other information pertaining to the cluster solutions. A report generator 228 may generate report regarding the cluster solutions.

In some implementations, the visualization interface may also provide the cluster solution(s) and/or evaluation results to a solution export subsystem 230. The solution export subsystem 230 may provide feedback information to the analytics system 200 or other systems in the AI-based communications system 100. For example, the solution export subsystem 230 may provide feedback information to an external rules engine 232 (or other feedback component), which may, for instance, use the feedback information to adapt one or more transformation rules. Additionally or alternatively, the solution export subsystem 230 may feedback information to the external data source 201, for instance, to adjust one or more variables or attributes in the data. In this way, the analytics system 200 may be fine-tuned to provide improved and more accurate calculations and computations.

For example, the solution export subsystem 230 may be configured to export information regarding a cluster solution to different types of external databases and external systems, and facilitate the implementation of the cluster solution by the external systems. In some implementations, the solution export subsystem 230 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the system may obtain data from the external system, retune the cluster solution based on the received data (such as changing variable selection), and send information regarding a revised cluster solution to the external system. As such, in some implementations, the analytics system 200 may enable more than just an analytics tool, but also enable a feedback-based and connected enterprise system.

The output interface 222 may include a visualization interface that provides the resulting cluster solution(s) and results of the evaluation to a report generator 228, which may generate a report to be output to the user, such as a security manager or other user. The report may include various types of information regarding the evaluation of the cluster solution(s) or other calculation, and may enable a user to adjust one or more variables of the analytics system 200 to fine-tune the clustering operations.

As a commercial example, for a data set of 10,000 customers with voluminous data (e.g., from a customer survey or customer transaction histories), the analytics system 200 may select some subset of variables from that data set (e.g. 5 variables) and generate a cluster solution that divides those 10,000 customers into 4 different groups. For example, cluster A may include "high-value" (or "low-risk") customers that generate a majority of the company's profits, such that the company may want to ensure maintaining its marketing budget for those customers; cluster B may include "moderate-value" (or "medium-risk") customers; cluster C may include "low-value" (or "high-risk") customers that generate very little profits and may even cost the company money; and cluster D may include "prospective" (or new targets) customers that represent opportunity for new sales, such that the company may want to market to them more aggressively.

Now consider a scenario in which, after those 10,000 customers have been assigned to four clusters, the company wants to organize and cluster another 1 million customers into the four cluster groups. The analytics system 200 may be configured to export a solution, e.g., as a basic algorithm, that the company's computer systems may be able to use to assign new customer records to the four cluster groups. As illustrative examples, the exported solution may be in the form of a special SQL function that can be processed by the company's customer database, or a Hadoop Map-Reduce algorithm that can similarly be processed on the company's BigData Hadoop cluster, etc. In some implementations, the exported solution may enable the company to implement the cluster solution in a manner that is independent of system that generated the cluster solution, such that the company can easily implement the cluster solution locally within its own systems. In some implementations, the exported solution may only need as input the selected subset of variables (e.g., 5 variables in the example above) that were used in the cluster solution computation.

By providing a composite technique of cluster generation and cluster evaluation, the analytics system 200 may enable the user to analyze the details and nuances of many (e.g., dozens of) solutions at the same time, rather than individually analyzing one solution at a time to see if each solution is appropriate. The analytics system 200 may therefore enable a user to explore a large number (e.g., millions) of cluster solutions efficiently in less time than it would take a typical practitioner to evaluate fewer (e.g., a couple dozen) cluster solutions.

In an example, the analytics system 200 may also include an external system, such as content delivery system 240, that may be controlled based on a selected cluster solution. For example, instructions may be sent to the content delivery system 240 based on attributes determined for clusters in the selected cluster solution. In an example, attributes may be identified for a cluster that are associated with customers shopping with a particular type of transaction mechanism (e.g., card, mobile device, etc.), which may indicate that a shopping pattern exists that is particular to shoppers from a particular geographic location, such as a north west region. The computation management subsystem 214 or another subsystem or layer not shown may send instructions to the content delivery system 240 to digitally send electronic notifications or coupons over a network to customers in the north west region. In an example, the content delivery system 240 may include a contact resource management system, such as provided by Salesforce.com®, Infusionsoft®, Microsoft Dynamics®, etc., which automatically targets customers. For example, data in a database that is associated with customers in the north region may be queried and for each customer customized alert notifications or coupons are automatically sent. The content delivery system 240 may have the flexibility to send various alert notifications with a time-interval of hours, days, weeks, etc. and also has an option to trigger sending through the instructions. In addition to alert notifications for proactive dispute resolution, these may also include marketing notifications, such as coupons, discounts, and/or other customer incentives associated with transactions. The external data source 201 may capture transaction behaviors of the targeted customers to determine whether the alert notifications or coupons are being used. Although clustering is being described here for purposes of marketing, similar techniques may be applied to resolving potential non-fraud disputes and to provide feedback for future processing of transaction data.

In some implementations, the user interfaces 212, 218, including the output interface 222, may be custom-designed user interfaces that facilitate some portion of the overall activity and, in some cases, may be used by multiple users with different roles. As such, the analytics system 200 may coordinate and facilitate a distributed process of cluster generation and evaluation, and streamline the tasks and roles that potentially involve the participation of multiple people.

It should be appreciated that while clustering is described in the aforementioned corporate marketing example, other various techniques and/or implementations may also be provided. For example, the analytics system 200 may be used to provide modeling, simulation, predictive analytics, forecasting, use of knowledge graphs, as well as various other statistical or data-driven approaches, and in non-marketing examples and scenarios. For instance, the analytics system 200 may be used to provide digital content and transaction management together with machine learning and predictive analytics in a variety of enterprise environments. These may include several specific scenarios that involve payment processing, non-fraud dispute resolution, customer experience, analytics-based reporting, and data-driven intelligence. The analytics system 200 may monitor and analyze data exchanged in a network in order to predict potential events (e.g., non-fraud disputes) and facilitate taking action on such events (e.g., resolution of these disputes in a proactive manner), all the while minimizing risk to an organization entity, reducing cumbersome processes, and enhancing efficiency for both an organization and its clients.

FIG. 3 illustrates a block diagram for machine learning processing 300 in an artificial intelligence (AI) based communication system, according to an example. Machine learning processing 300, according to various examples, may including building and training multiple machine learning classifiers, such as boosted decision trees. It should be appreciated that systems 100, 200, and 300 may include additional components and that one or more of the components described herein may be removed and/or modified without departing from a scope of what is described herein.

Machine learning classifiers may perform various processing techniques to detect particular attributes of interested data or digital content (e.g., text or images). Such attributes may be used for matching to other textually/visually similar content. It should be appreciated that data, as described herein, may also include textual data, audio data, visual data, and/or transactional data. In other words, "data processing," as used herein, may include, without limitation, processing and analysis of multimodal information. For example, this may include processing of textual, audio, video, or other similar data in addition to the actual visual or image data, and in some examples, this may include data associated with financial transactions, e.g., payment transaction by an account holder or a cardholder.

Boosted decision trees may include many layers to detect and classify particular features of digital content. Furthermore, each layer of the boosted decision tree may have a multitude of parameters associated with it. Specific values of those parameters for a successful and accurate digital content classification may not be known a priori. Machine learning processing 300, according to various examples, may provide a method for building and training boosted decision trees to output an accurate classification of digital content, which in turn may be used for predicting and/or resolving non-fraud disputes associated with payment transactions.

Multiple boosted decision trees may be built and trained by a machine learning processing 300. According to an example, a boosted decision tree built and trained by a machine learning processing 300 may identify and determine one or more attributes of a transaction. In an example, attributes of a transaction may be compared to attributes of stored or historical transaction and disputes data to find similarities using a matching process. The attributes may be high-level abstractions represented by vectors of numeric values that may include features of a transaction (e.g., feature vectors), as well as any associated text, audio, or other multimodal data. An example feature vectors for predicting non-fraud disputes may include merchant name, merchant identification, cardholder or account holder name, account number or identification, acquirer BIN, etc. These feature vectors, along with other data or information may be used to help build and/or train a boosted decision tree, for example, in machine learning processing 300.

As discussed in more detail herein, the boosted decision tree may operate in real-time or near real-time to facilitate accurate transaction matching of objects from a target or incoming transaction. Accordingly, together with natural language processing (NLP) and/or other AI-based processing techniques, a machine learning processing 300 may be used to better predict non-fraud disputes and reduce inefficiencies associated with resolution of these disputes.

The machine learning processing 300 may be performed by the analytics system 200 of FIG. 200 (e.g., the processor 203) to help predict non-fraud disputes. Referring back to FIG. 3, test data sets and validation sets may be created, for example, from the historical transaction and disputes data 302 or other digital content, and may be used to build and validate a boosted decision tree in a machine learning subsystem 306. As described above, the attributes may be high-level abstractions represented by feature vectors (e.g., merchant name, merchant identification, cardholder or account holder name, account number or identification, acquirer BIN, etc.). The boosted decision tree, for example, may be trained to identify classes (e.g., categories) of objects in digital content. The training data for the boosted decision tree may include digital content, each having one or more objects, a class for each object, etc.

Other various boosted decision trees may be built and trained in a similar fashion. For example, as historical transaction and disputes data 302 is being used dissected and represented by feature vectors A 304A, associated transactions and dispute labels 308 may also be used to help train the machine learning subsystem 306. For example, the associated transactions and dispute labels 308 may include various dispute categories related to historical transaction and disputes data 302.

As target input arrives as new transaction data 310, the boosted decision trees may be built and trained to dissect and represent the new transaction data 310 as feature vectors B 304B. Since the machine learning subsystem 306 has some understanding of transactions and associated labels for transactions, it may coordinate with predictive analytics 312 to determine whether any of the new transaction data 310 yields any potential non-fraud disputes. If there is a numerical threshold that is met (e.g., via scoring or other statistical metric), an alert or notification 314 of such potential non-fraud dispute may be provided. It should be appreciated that input content may also come from a variety of other data sources, not just directly from historical or new transaction data. It should also be appreciated that the machine learning process 300 may involve boosted decision tree being comprised of multiple convolutional layers, fully connected layers, and/or a binarized sigmoidal layer. These variations may help the machine learning process 300 better parse, identify, match, and/or understand the extracted digital content associated with transactions. Other various examples may also be provided.

In one example, a fully connected layer may compute the output as:

$$Y=FC(X)=W*X+B, \text{ where}$$

X may represent the output of the previous layer, a matrix of m*1 values; W may represent the weight parameter of the layer, a matrix of n*m values; B may represent a bias parameter of the layer, a matrix of n*1 values; and Y may represent the output of the fully connected layer, a matrix of n*1 values.

This output may be an input of the following rectified linear unit (RELU) layer:

$$y=RELU(x)=0 \text{ if } x<0; y=RELU(x)=x \text{ if } x>=0, \text{ where}$$

each element of the matrix X may be referred to as an element x. The output of the RELU layer may be a matrix of the same dimension as the input, e.g., a matrix of n*1 values in the range of [0,+∞). The output of the RELU layer may then be an input of the binarized sigmoidal layer, which may generate a value of 0 or 1 for each attribute of multiple attributes of the extracted content. The sigmoidal layer may compute the output as sigmoid(x)=1/(1+exp(-x)) for each input element x. The input element x may include values determined from a matrix that is output from a previous layer of the boosted decision tree, for example, the RELU layer explained above.

The output value of the sigmoidal layer may be a matrix of n*1 values in the range of (0,1). The output matrix may then binarized by applying a threshold: y=0 if x<threshold; y=1 if x>=threshold.

The extracted content attributes may include the values for the attributes determined by the sigmoidal layer of the boosted decision tree. The extracted content attributes may be stored in a data store and may be used by a server to identify similar content, as is further described below.

The analytics system 200 or associated servers 113, 113*b* may compare the extracted content to other digital content to identify similarities, and for use in comparisons, modeling, and predictive analytics. In an example, to determine similarity between the extracted content attributes and attributes of other content, a Hamming distance may be calculated. The Hamming distance is an example of a similarity value. A similarity detector may be used to determine from the similarity values a set of one or similar content that are textually or transactionally similar to the extracted content. For example, content associated with the "n" smallest Hamming distances may be identified as content similar to the extracted content, where "n" is an integer greater than or equal to 1. Determining the similar content that are the most similar to the extracted content may be used for a variety of applications. Although Hamming distance is described herein, it should be appreciated that other statistical or mathematical determinations for digital content comparisons may also be used or provided.

It should be appreciated that the training sets may include supervised or semi-automated training sets that include labeled data objects. Although examples described herein are mostly directed to boosted decision trees, it should be appreciated that other machine learning models may also be provided. These may include convolutional neural networks (CNNs) to generate classifiers. To train the CNN, network parameters for the CNN may be initialized. Predetermined parameter models may be available that specify initial network parameters. Training data may be input into the initialized CNN to calculate predictions of classes for the images of the training set. The difference between the expected classes, which are specified for each image and the predicted classes, may be determined and used to update the network parameters with a back-propagation function. This process may be iterated until a satisfactory prediction rate is achieved to create the CNN.

The CNNs, as described herein, may include a number of convolutional and subsampling layers followed by fully connected layers. In examples where input is visual or image-based (e.g., a transaction receipt or other image), a convolutional layer may be represented by a m×m×r image where m may be the height and width of the image, and r may be the number of channels, e.g. an RGB (red, green, blue) image has r=3. The convolutional layer may have k filters (or kernels) of size n×n where n is smaller than the dimension of the image. The size of the filters may give rise to the locally connected structure, which may each be convolved with the image to produce k feature maps of size m−n+1 (supposing the stride=1 and padding=0). Each map may then be subsampled typically with mean or max pooling over p×p contiguous regions where p may range between 2 for small images and N (N>=5) for larger inputs. Either before or after the subsampling layer, an additive bias and rectified linear unit (RELU) layer may be applied to each feature map.

Once the CNN is trained to create the CNN, the CNN may be used to index feature vectors A 304*a* of the extracted content. For example, the output of the "sigmoidal layer 8" may be used as the index of the extracted content, and includes a binarized vector, such as [0 1 1 0 . . . 1], representing the visual features (also referred to as the attributes) of the extracted content. For example, the binarized vector may represent an index of visual features $x_i$ determined from a previous layer (e.g., RELU layer 7) that are binarized to 0 or 1. For example, for each feature x, a value of 0 or 1 may be determined based on whether $x_i$ is greater than or equal to a threshold (e.g., $x_i$=1) or less than the threshold (e.g., $x_i$=0). The threshold may be selected by maximizing the classification accuracy on training data. Content to be compared to an extracted content may also be run through the CNN to determine a binarized vector of attributes for each piece of content, and the binarized vectors may be stored in the data store. The binarized vector of attributes for the extracted content may be compared to the binarized vectors of attributes for other content to identify similar content. Hamming distance between two binarized vectors of equal length may be a number of positions at which the corresponding symbols are different. For example, H([0 11],[1 1 1])=1; and H([0 0 1],[1 1 1])=2. Comparisons that have the smallest hamming distances may yield the content that are most similar to the extracted content. These and other techniques may be used to predict non-fraud transaction disputes.

Figure 4A:
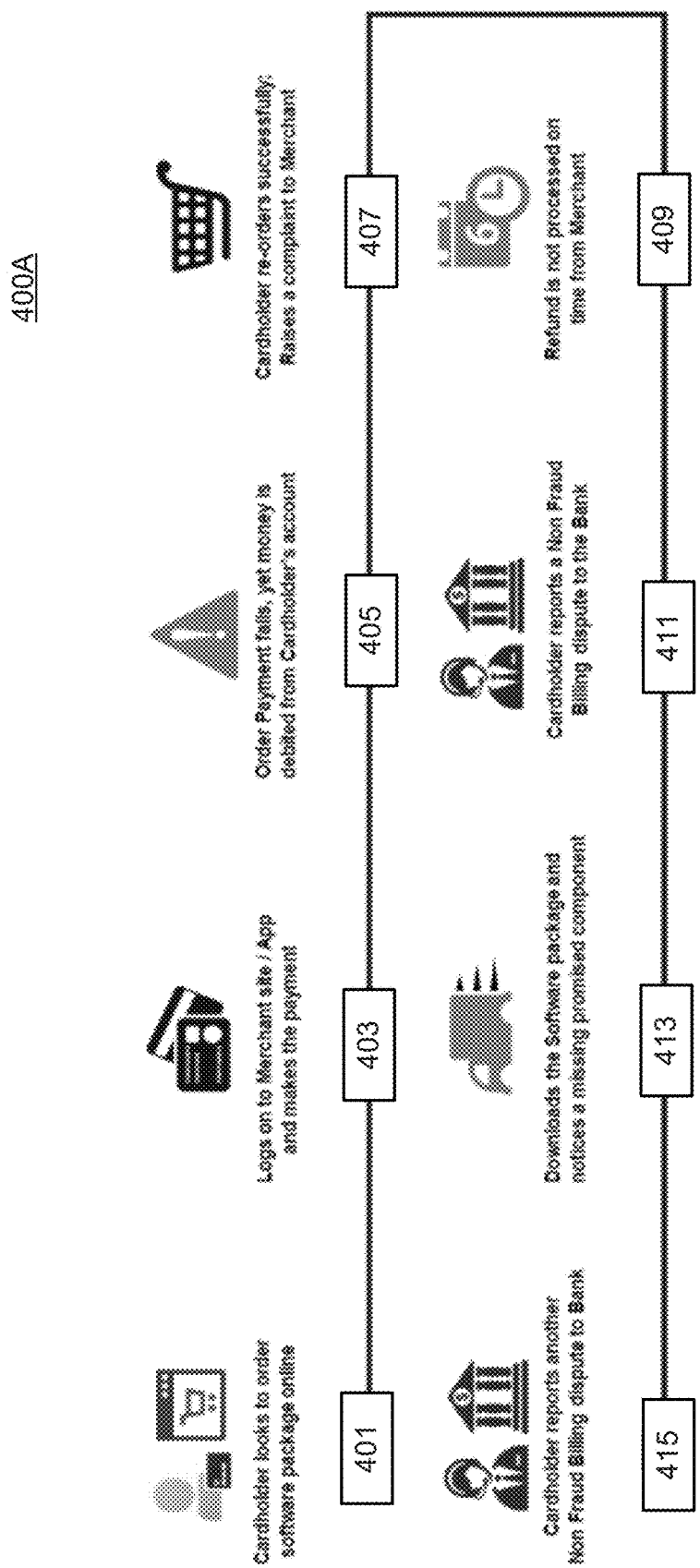
FIG. 4A-4B illustrate data flows for digital content and transaction management, according to an example.
Figure 4B:
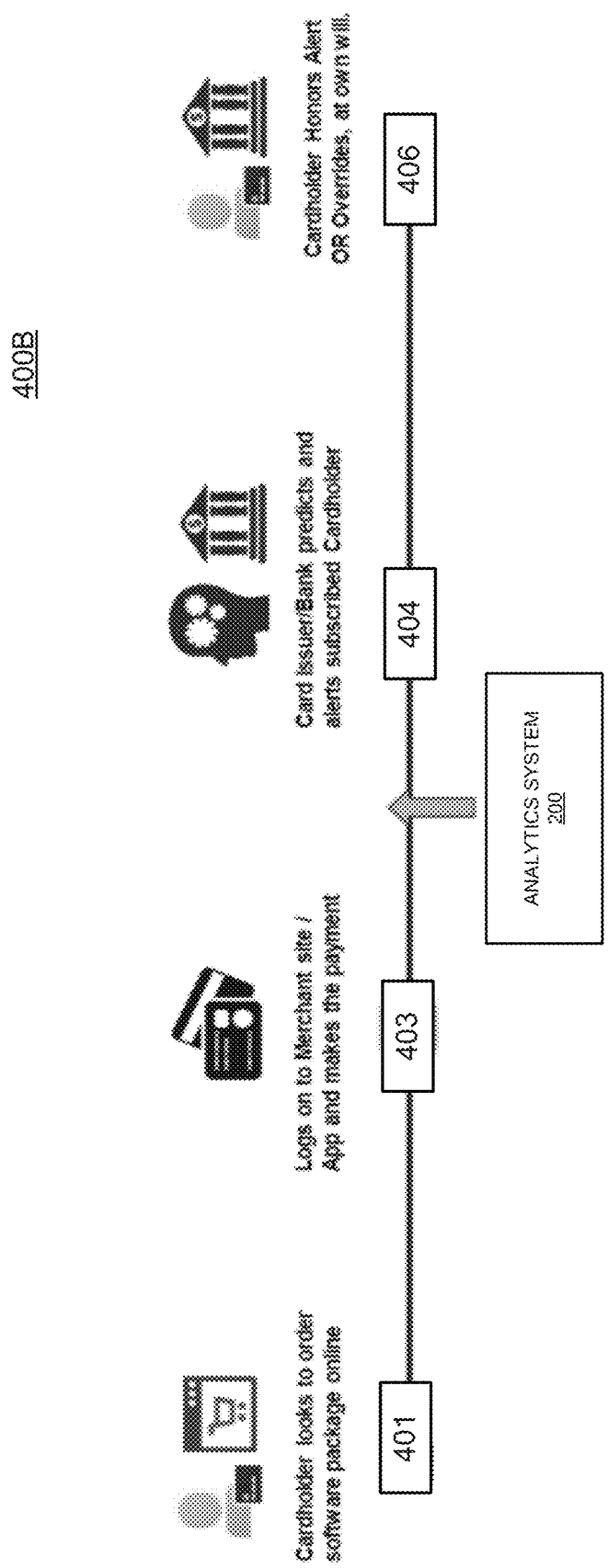

FIG. 4A-4B illustrate data flows for digital content and transaction management, according to an example. FIG. 4A illustrates a data flow 400A for digital content and transaction management, according to an example. At 401, a cardholder may look to order a software package online or other goods or services. At 403, he or she may log on to a merchant site or application to make a payment. At 405, the order payment may fail (for one reason or another); however, money may still be debited from cardholder's account. At 407, the cardholder may seek to re-order the software package, and this time is it successful. Here, the cardholder may also raise a complaint to the merchant with regard to the initial failed order. At 409, it may be determined that a refund is the proper course of action; however, the refund may not be processed on time from the merchant. At 411, the cardholder may report a non-fraud billing dispute with his or her bank. At 413, the purchaser may download the software package but notice that there is a missing component. At 415, the cardholder may then report another non-fraud billing dispute to the bank. From this example, it may be easy to see how a single transaction may lead to several potential non-fraud disputes. This entire process may result in customer dissatisfaction, diminished merchant reputation, and cumbersome resolution by the bank.

FIG. 4B illustrates a data flow 400B for digital content and transaction management using the analytics system 200, according to an example. Similar to FIG. 4A, at 401, a cardholder may look to order a software package online or other goods or services, and at 403, he or she may log on to a merchant site or application to make a payment. However, with the analytics system 200 (e.g., machine learning and predictive analytics), it may be determined that there is a likelihood of a non-fraud dispute with this particular transaction. This may be based on the cardholder, transaction history, merchant, type of purchase, or other determination. As a result, at 404, the card issuer or bank may predict and alert the cardholder of a potential non-fraud dispute, and seek to resolve this potential issue as early on in the process as possible. At 406, the cardholder may honor the alert or override the notification at his or her own choosing.

In this way, the cardholder may authorize, decline, or hold the potential dispute, which may be helpful in resolving the potential non-fraud dispute issue (if and when it materializes). The bank may also have on record the cardholder's decision or authorization (or lack thereof), which may be used to provide improved transactions and resolution management, especially when dealing with large volumes of disputes.

Figure 5:
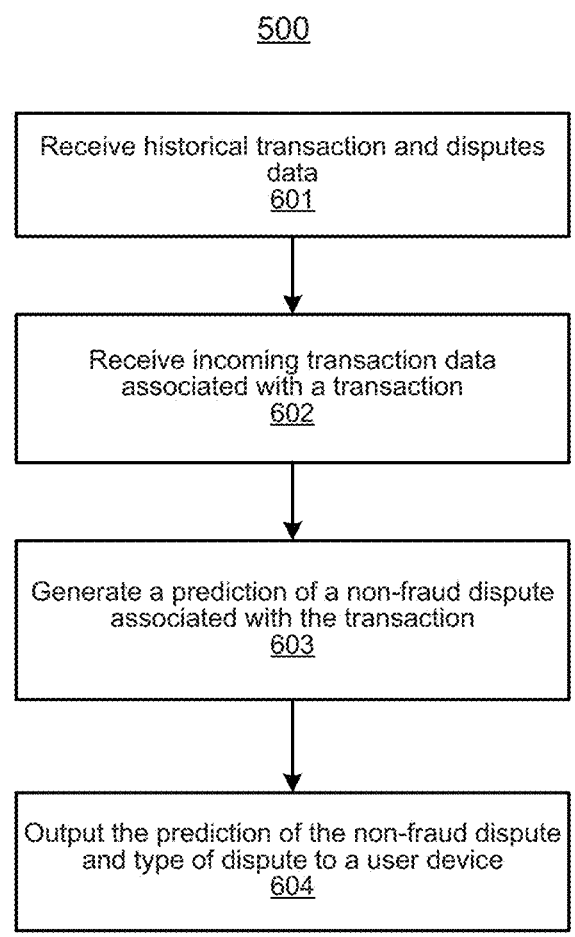
FIG. 5 illustrates a flow chart of a method for digital content and transaction management using artificial intelligence (AI) based communication with machine learning predictive analytics, according to an example.

FIG. 5 illustrates a flow chart of a method for digital content and transaction management 500 using artificial intelligence (AI) based communication with machine learning predictive analytics, according to an example. The method 500 is provided by way of example, as there may be a variety of ways to carry out the method described herein. Although the method 500 is primarily described as being performed by system 100 as shown in FIG. 1 or system 200 as shown in FIG. 2, according to data flow of FIG. 4A, the method 500 may be executed or otherwise performed by other systems, or a combination of systems. Each block shown in FIG. 5 may further represent one or more processes, methods, or subroutines, and one or more of the blocks may include machine-readable instructions stored on a non-transitory computer readable medium and executed by a processor or other type of processing circuit to perform one or more operations described herein.

At block 501, the data access interface 202 may receive historical transaction and disputes data. The historical transaction and disputes data may be from at least one data source associated with an account issuer. In an example, the account issuer may be a financial institution. In other examples, the account issuer may another organization entity.

At block 502, the data access interface 202 may receive incoming transaction data. The incoming transaction data may be associated with a transaction from at least one data source associated with an account holder. In an example, the account holder may have an account with the financial institution or other organizational entity.

It should be appreciated that the data source associated with the account holder may include an enterprise resource planning (ERP) system, a point of sale (POS) device, a database, a mobile device, a website, a document, a reporting system, other data source, or a combination thereof. The data source associated with the account issuer may include a website, a document, an enterprise resource planning (ERP) system, a database, a web feed, a sensor, a geolocation data source, a server, an analytics tool, a mobile device, a reporting system, other data source, or a combination thereof.

At block 503, the processor 203 may generate a prediction for a likelihood of a non-fraud dispute associated with the transaction associated with the account holder. The prediction may be generated by examining historical transaction and disputes data from the at least one data source associated with an account issuer. The prediction may also be generated by retrieving non-fraud dispute attributes based on the examination of historical transaction and disputes data.

In an example, the non-fraud dispute attributes may include dispute categories derived from the historical transaction and disputes data. In addition, examining historical transaction and disputes data and retrieving non-fraud dispute attributes may be based on machine learning techniques that comprise building and training at least one boosted decision tree. Alternatively, a convolutional neural network (CNN) may also be used. The convolutional neural network (CNN) may also be comprised of convolutional layers, fully connected layers, binarized sigmoidal layers, or combination thereof.

The processor 203 may also parse the incoming transaction data from the at least one data source associated with an account holder. The processor 203 may also apply predictive analytics to the incoming transaction data from the at least one data source associated with an account holder based at least on the historical transaction and disputes data and the non-fraud dispute attributes. In one example, the predictive analytics may comprise a prediction value based on binarized classification modeling. In another example, the predictive analytics applied to the incoming transaction data may include pattern recognition, forecasting, simulation, modeling, natural language processing (NLP), multi-lingual support, image processing and recognition, knowledge graph, intellective computing, synoptic evaluation, decision tree, other technique, or a combination thereof.

It should be appreciated that the predictive analytics includes a prediction value. The processor 203 may determine that the prediction value meets a predetermined threshold, and generate a prediction for the likelihood of a non-fraud dispute associated with the transaction associated with the account holder based on the prediction value and the predetermined threshold. In an example, the predetermined threshold may be set to a default threshold by the processor 203. Alternatively, the predetermined threshold may also be set or updated by an account issuer, for example, based on internal policy or after a review or the thresholds generated by the processor 203.

The processor 203 may also generate a report with the prediction for the likelihood of a non-fraud dispute associated with the transaction associated with the account holder. The prediction may also include a prediction of the type of non-fraud dispute or type of situation surrounding the non-fraud dispute associated with the incoming transaction data. For example, some non-fraud dispute situations may include: Duplicate Processing, Credit Not Processed, Paid by Other Means, Defective Merchandise, Delayed Service, Misrepresented Merchandise/Service, etc. In another example, the processor 203 may also generate an alert notification to inform the account issuer and/or the account holder of the likelihood of a non-fraud dispute associated with the transaction associated with the account holder. The alert notification may be an option selected by the account holder. For example, if he/she is subscribed to receive these potential dispute alerts, the account holder would receive them. However, if he/she intentionally does not subscribe to receive such alerts, the system 200 may not hinder the transaction payment experience for an account holder, who doesn't want to be bothered by these alerts for any reason.

In yet another example, the processor 203 may also generate a recommended action for the user based on the likelihood of a non-fraud dispute associated with the transaction associated with the account holder.

At block 504, the output interface 222 may output to a user device the report with the prediction for the likelihood of a non-fraud dispute associated with the transaction associated with the account holder.

Figure 6A:
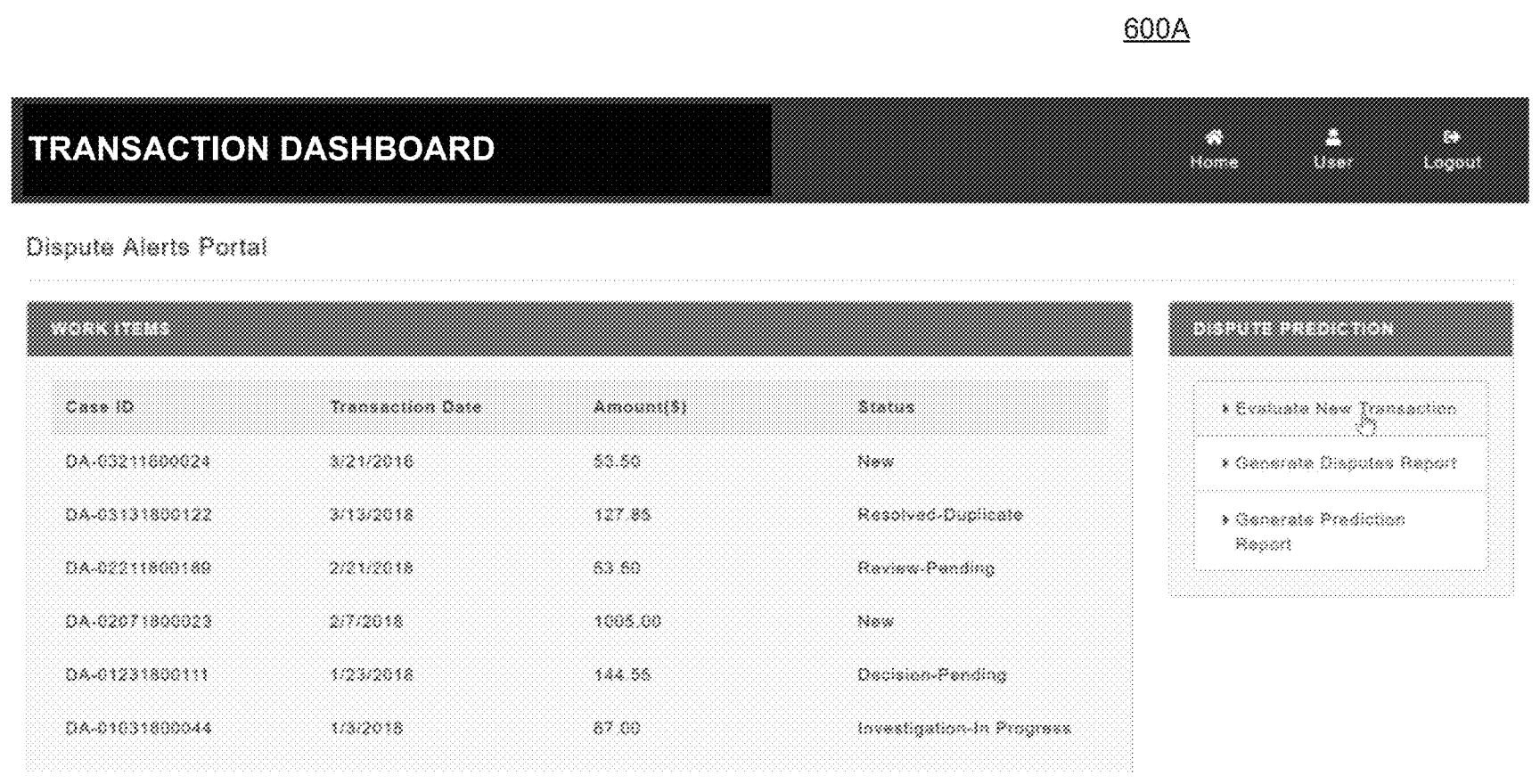
Figure 6B:
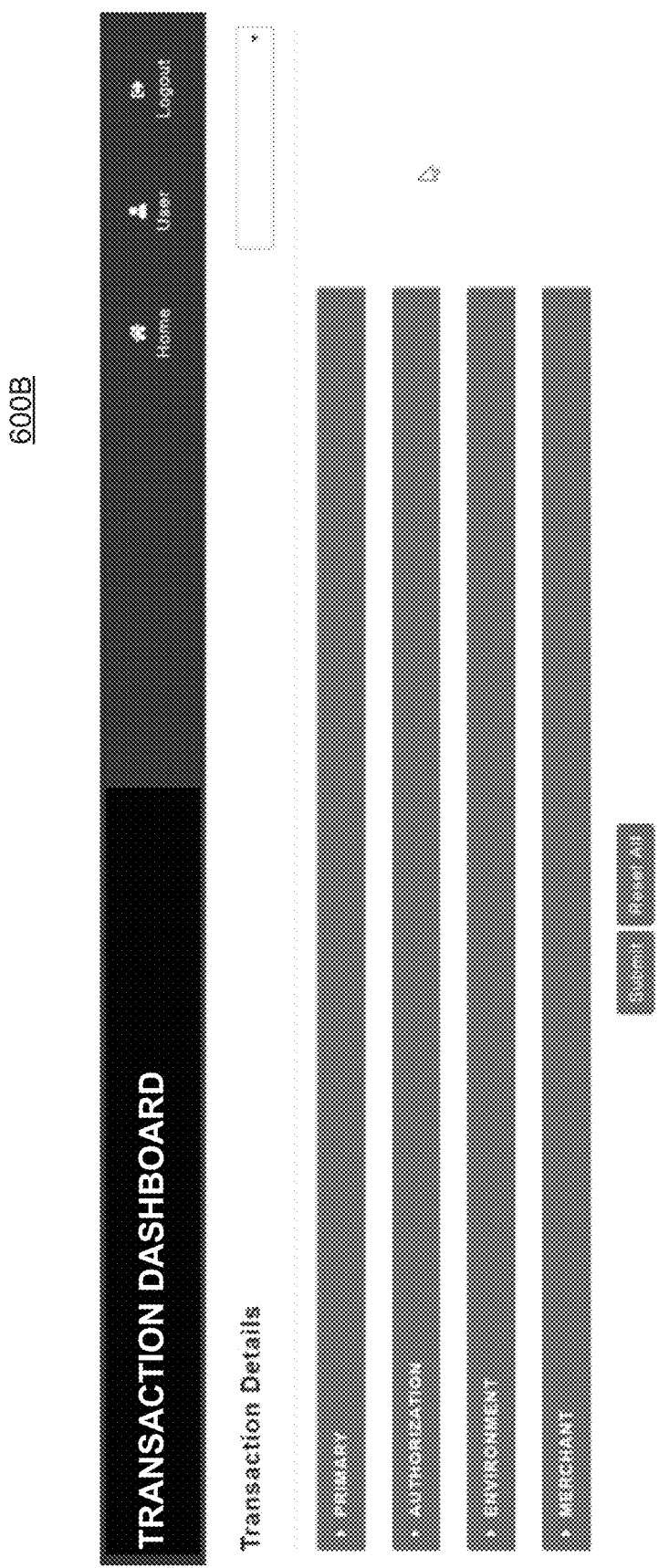

FIGS. 6A-6K illustrate screens for digital content and transaction management using artificial intelligence (AI) based communication with machine learning predictive analytics, according to an example. FIG. 6A illustrates a screen 600A for transaction dashboard of an artificial intelligence (AI) based communication system for digital content and transaction management using with machine learning predictive analytics, according to an example.

FIG. 6A illustrates a screen 600A for transaction dashboard of an artificial intelligence (AI) based communication system for digital content and transaction management using with machine learning predictive analytics, according to an example. FIG. 6A illustrates a screen 600A for transaction dashboard of an artificial intelligence (AI) based communication system for digital content and transaction management using with machine learning predictive analytics, according to an example. As shown, screen 600A depicts a Dispute Alerts Portal that lists various work items. Screen 600A may also depict a Dispute Prediction section for a user to evaluation various items, such as evaluation new transactions, generate disputes report, or generate prediction report. In the event Evaluate New Transactions is selected, additional details may be provided in the transaction dashboard.

FIG. 6B illustrates a screen 600B for transaction dashboard of an artificial intelligence (AI) based communication system for digital content and transaction management using with machine learning predictive analytics, according to an example. As shown, screen 600B may provide a dashboard including transaction details for a new transaction. For example, the dashboard may include several categories or selections, such as Primary, Authorization, Environment, and Merchant. These categories may be used to help identify the new transaction. If the Primary categories is selected, several transaction items may be provided.

Figure 6C:
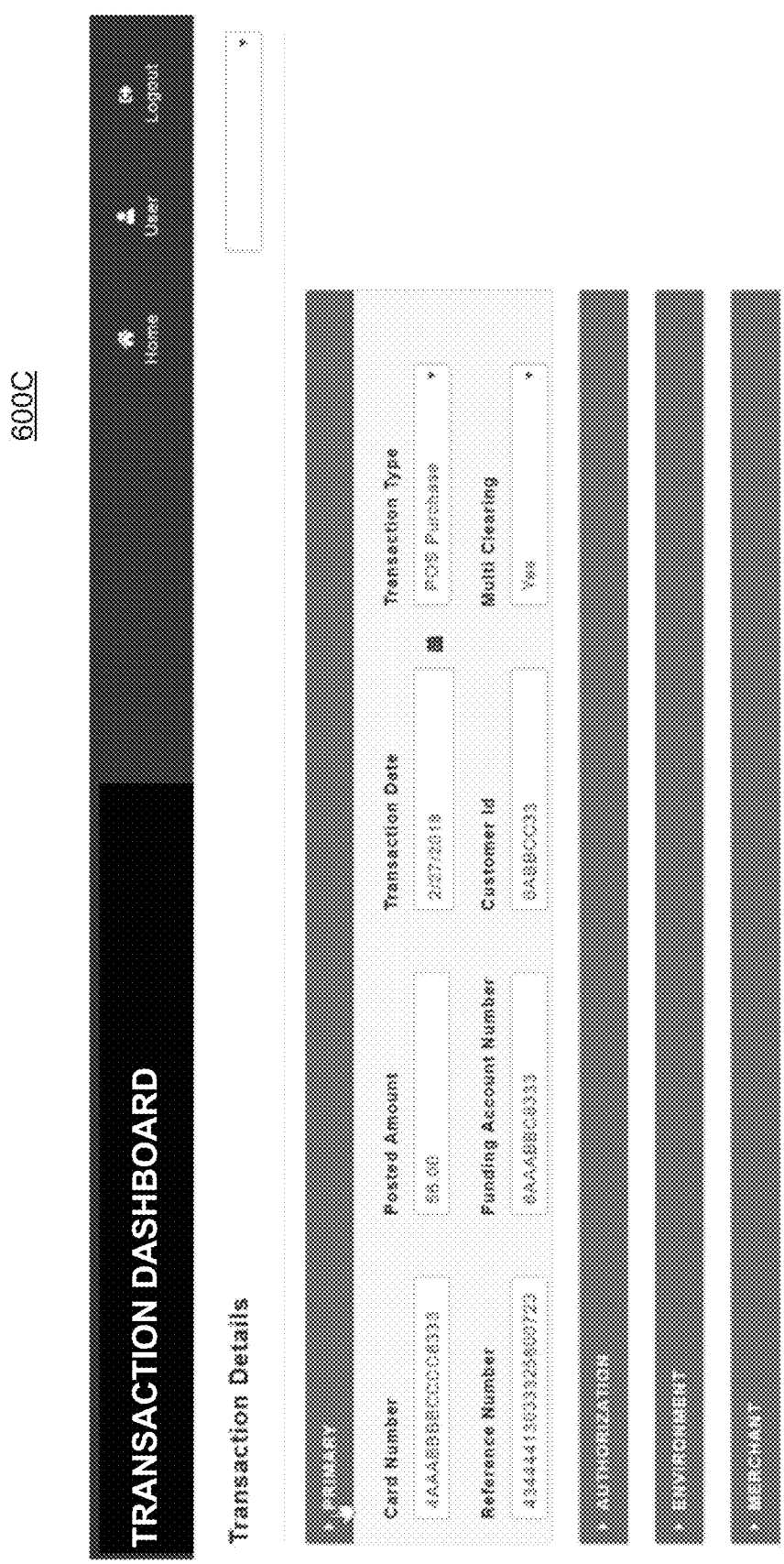

FIG. 6C illustrates a screen 600C for transaction dashboard of an artificial intelligence (AI) based communication system for digital content and transaction management using with machine learning predictive analytics, according to an example. As shown, screen 600C depicts various form fields when Primary is selected (or pulled down). Here, a user may view (or change) various fields associated with the transaction. These fields may include, not limited to, card number, posted amount, date, type, reference number, account number, customer ID, or other field.

Figure 6D:
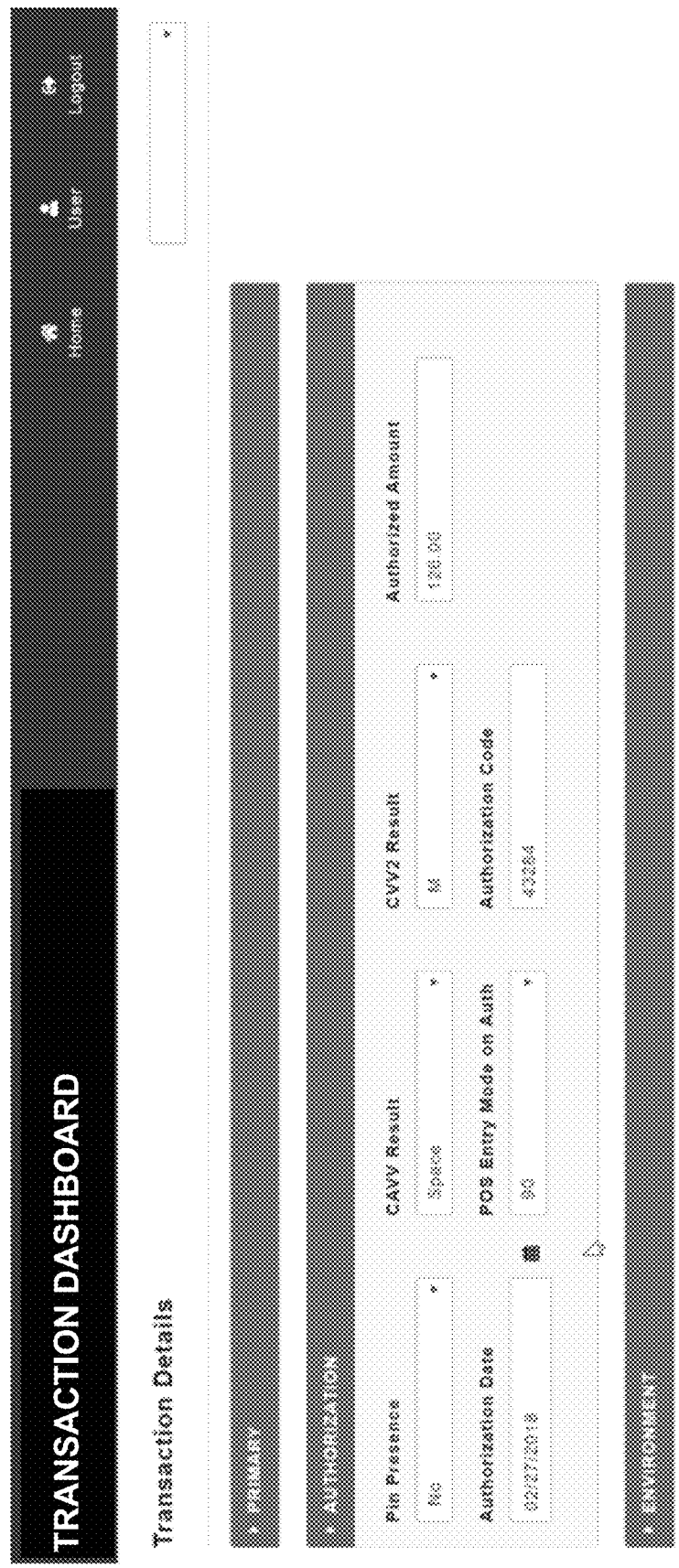

FIG. 6D illustrates a screen 600D for transaction dashboard of an artificial intelligence (AI) based communication system for digital content and transaction management using with machine learning predictive analytics, according to an example. As shown, screen 600D depicts various form fields when Authorization is selected (or pulled down). Here, a user may view (or change) various fields associated with the transaction. These fields may include, not limited to, PIN presence, CAVV result, CVV2 result, authorized amount, date, POS entry mode, authorization code, or other similar field.

Figure 6E:
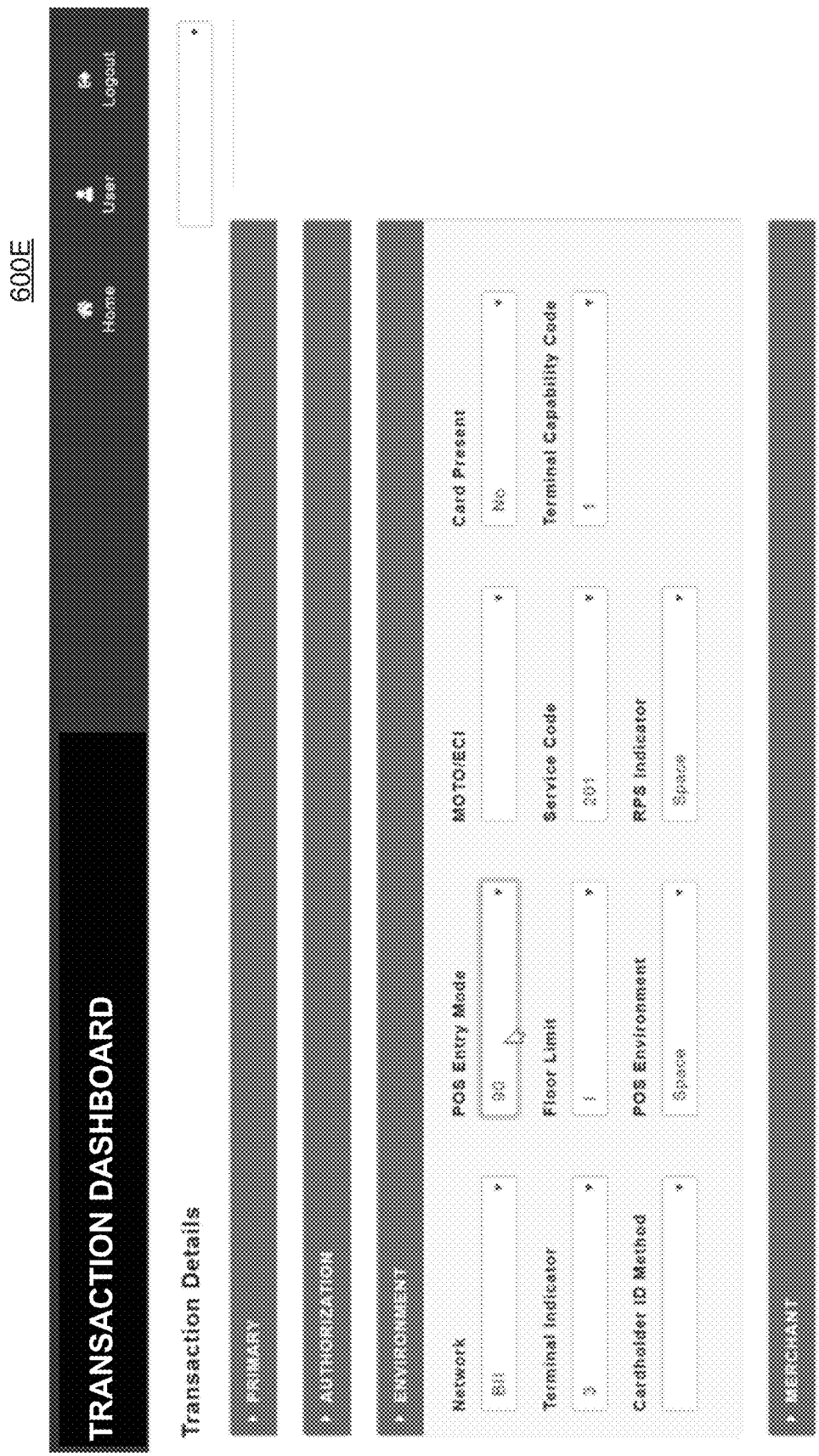

FIG. 6E illustrates a screen 600E for transaction dashboard of an artificial intelligence (AI) based communication system for digital content and transaction management using with machine learning predictive analytics, according to an example. As shown, screen 600E depicts various form fields when Environment is selected (or pulled down). Here, a user may view (or change) various fields associated with the transaction. These fields may include, not limited to, network, POS entry mode, MOTO/ECI, card present, terminal indicator, floor limit, service code, terminal capability code, cardholder ID method, POS environment, RPS indicator, or other field.

Figure 6F:
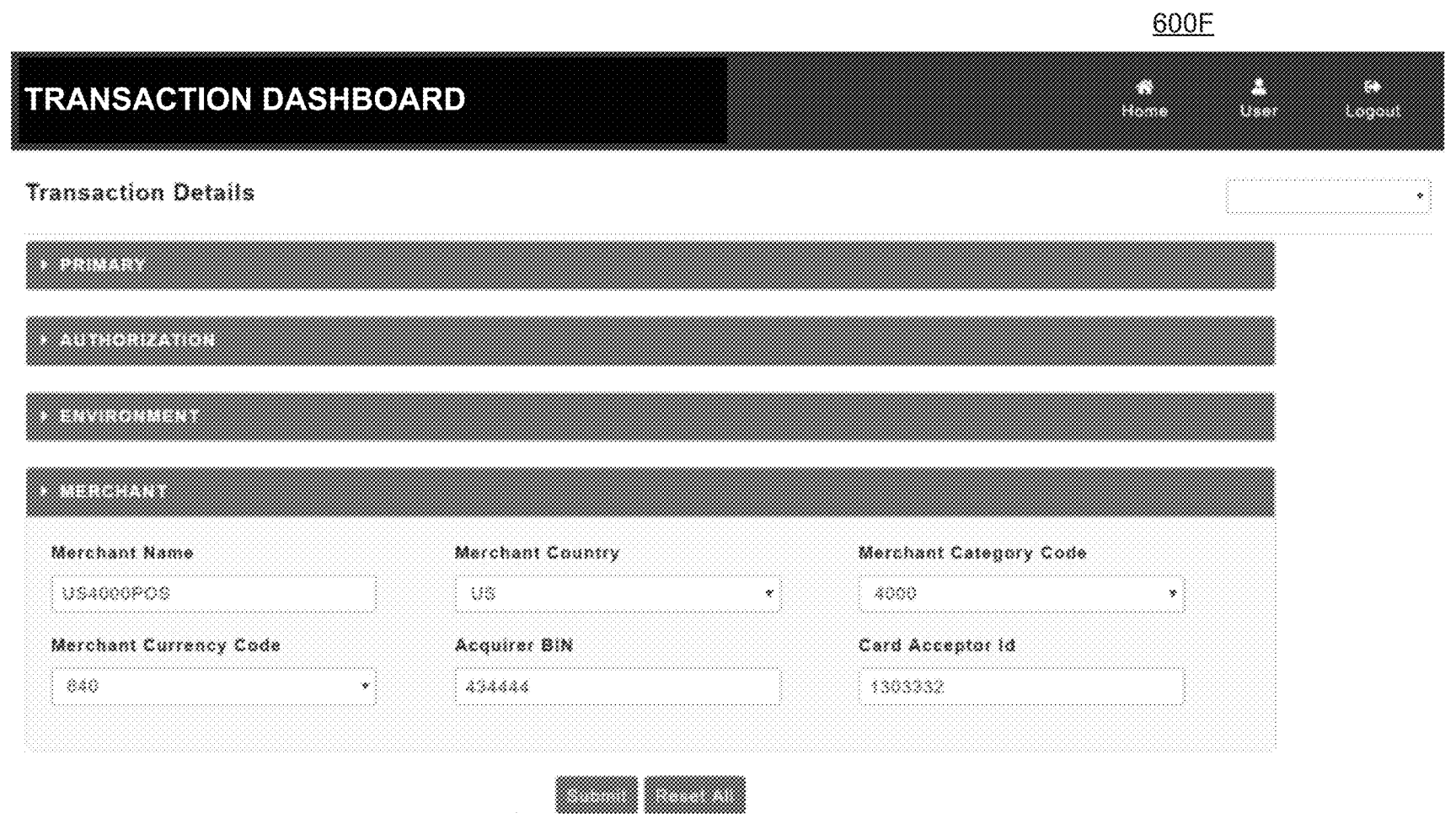

FIG. 6F illustrates a screen 600F for transaction dashboard of an artificial intelligence (AI) based communication system for digital content and transaction management using with machine learning predictive analytics, according to an example. As shown, screen 600F depicts various form fields when Merchant is selected (or pulled down). Here, a user may view (or change) various fields associated with the transaction. These fields may include, not limited to, merchant name, country, category code, currency code, acquirer BIN, card acceptor ID, or other field. Once all fields of the various categories are verified and finalized, a user may click "submit" and view a Dispute Alert Prediction Result.

Figure 6G:
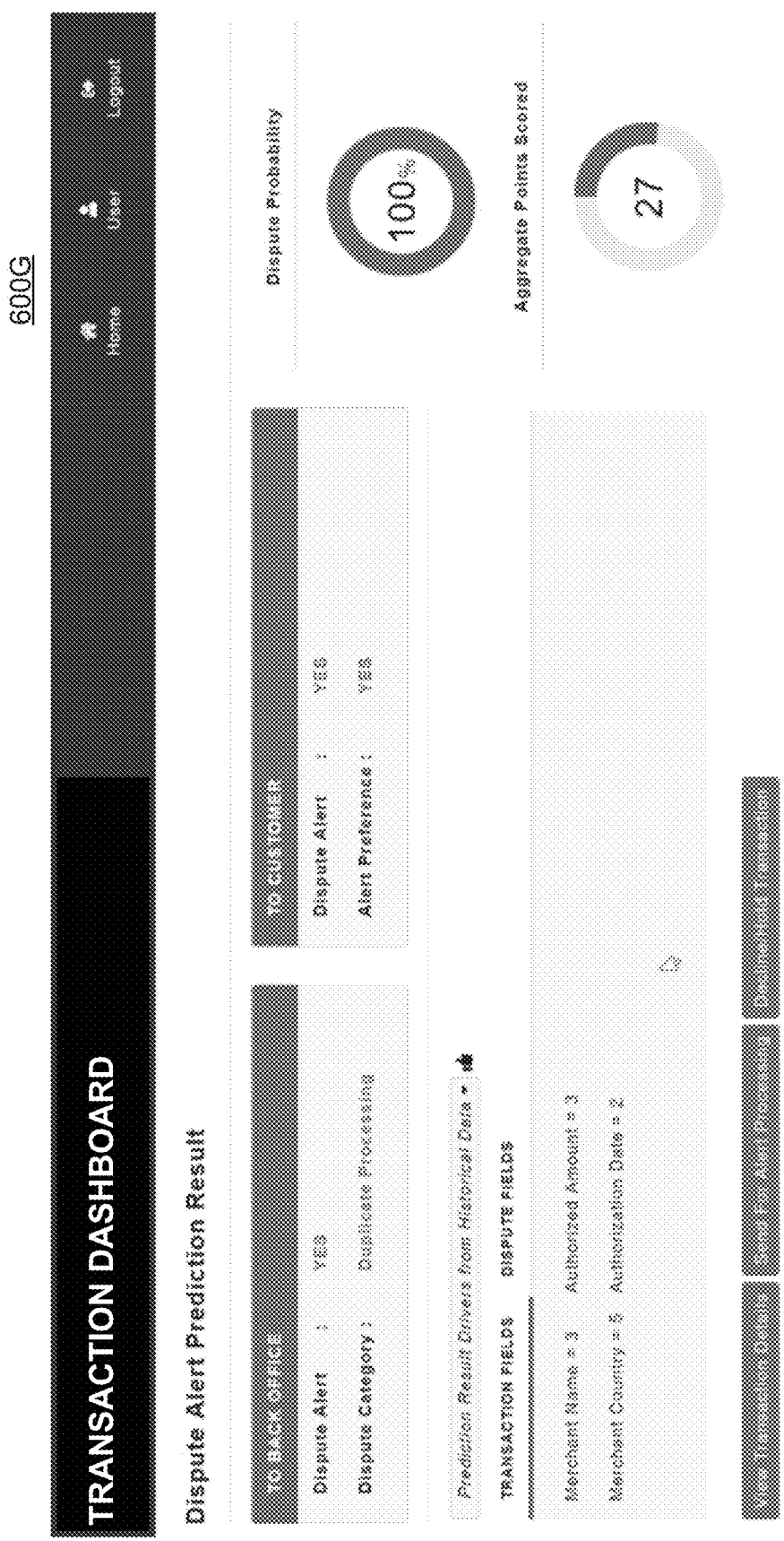

FIG. 6G illustrates a screen 600G for transaction dashboard of an artificial intelligence (AI) based communication system for digital content and transaction management using with machine learning predictive analytics, according to an example. As shown, screen 600G depicts a Dispute Alert Prediction Result. The Dispute Alert Prediction Result shows a probability of a potential non-fraud dispute. In this case, the probability is 100%. This prediction is based on "prediction result drivers from historical data." The screen 600G also shows that dispute has been alerted both to back office and to customer (which the customer has elected to receive). Aggregate points scored may also be presented. If more details are desired, the user may click "Transaction Details" to view the fields that triggered the potential for non-fraud dispute.

Figure 6H:
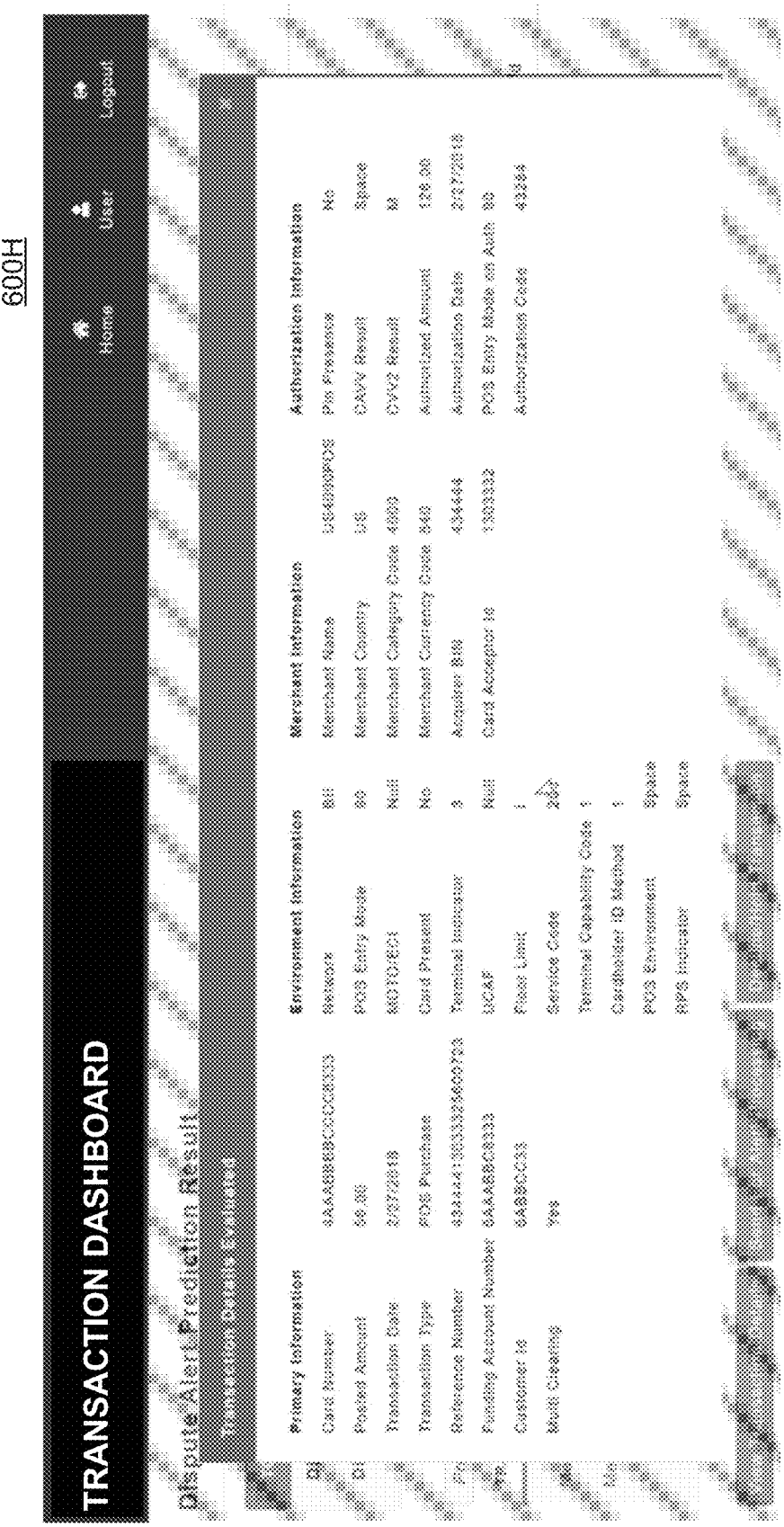

FIG. 6H illustrates a screen 600H for transaction dashboard of an artificial intelligence (AI) based communication system for digital content and transaction management using with machine learning predictive analytics, according to an example. As shown, screen 600H depicts transaction details that a user may desire to evaluate and perhaps understand how a potential non-fraud dispute may be predicted. Dispute Fields may also be selected to narrow the fields that triggered the non-fraud dispute prediction.

Figure 6I:
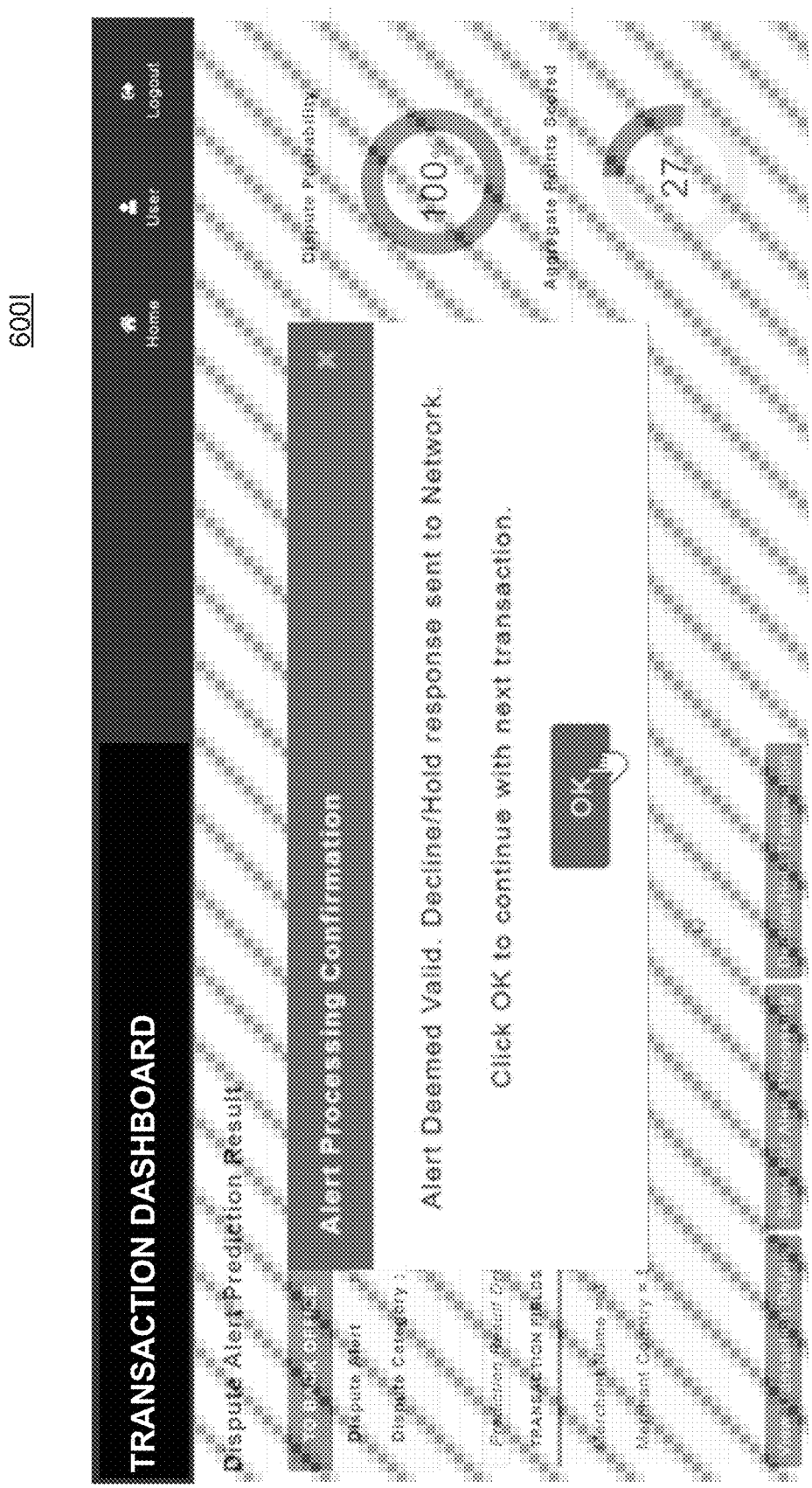

FIG. 6I illustrates a screen 600I for transaction dashboard of an artificial intelligence (AI) based communication system for digital content and transaction management using with machine learning predictive analytics, according to an example. As shown, screen 600I depicts a pop up screen that allows the user (e.g., financial institution) to acknowledge and/or confirm that that dispute prediction appears valid, and proceed to "Decline/Hold" the response sent to network. The user may click "OK" and continue to investigate the next transaction.

FIG. 6J illustrates a screen 600J for transaction dashboard of an artificial intelligence (AI) based communication system for digital content and transaction management using with machine learning predictive analytics, according to an example. As shown, screen 600J may show that particular transaction as being "resolved." The user may then proceed to evaluate (or resolve) other various transactions for potential disputes before they arise.

Figure 6K:
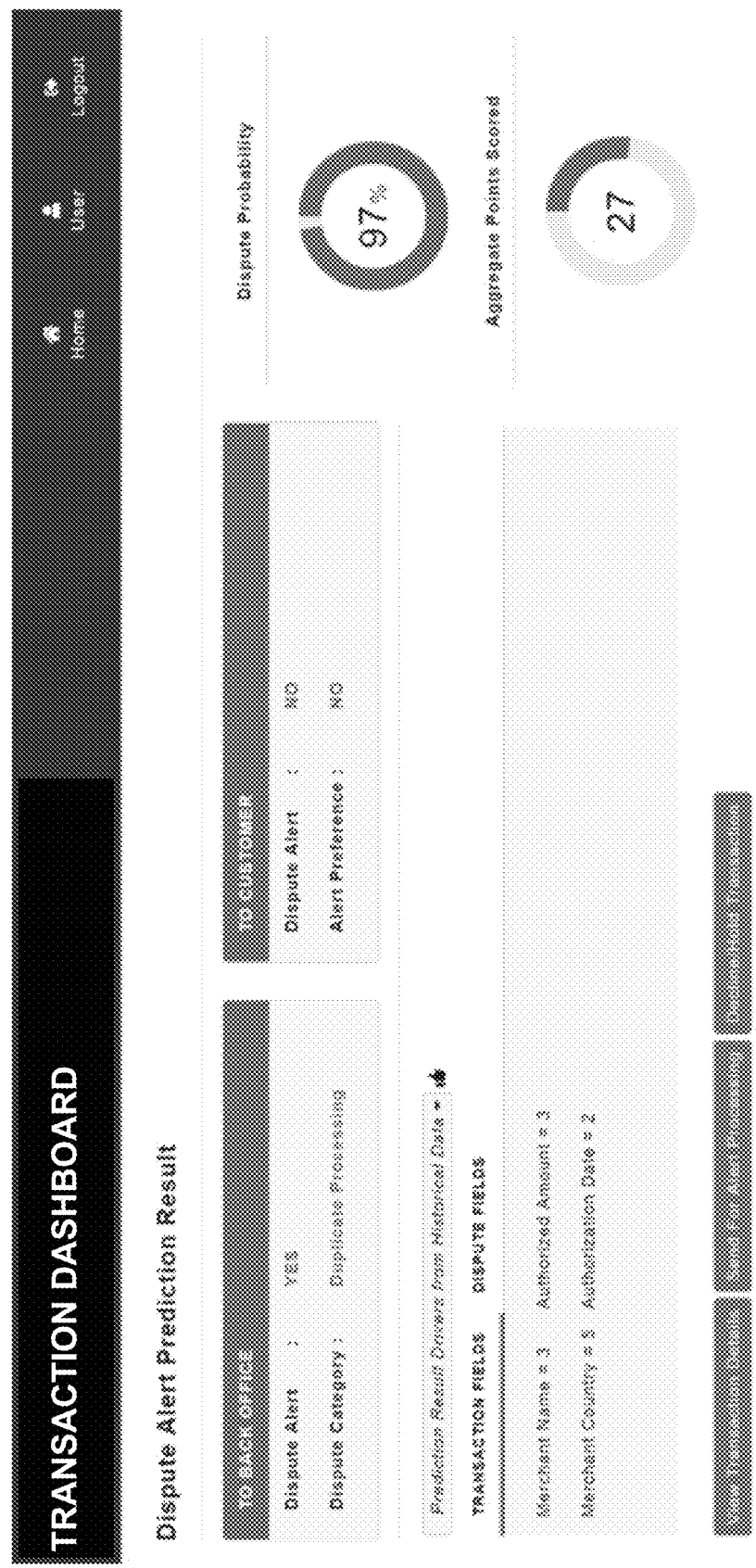

FIG. 6K illustrates a screen 600K for transaction dashboard of an artificial intelligence (AI) based communication system for digital content and transaction management using with machine learning predictive analytics, according to an example. As shown, screen 600K depicts an alternative to screen 600G of FIG. 6G. Here, the customer may have elected not to receive dispute alerts or notifications (as indicated by "No"). As a result, the user may provide an alert or notification to the back office in order to facilitate resolution of this potential issue at the financial institution, but the customer, in this example, will not be sent an alert because of his or her convenience. This may help provide a customized customer experience.

It should be appreciated that other various screens or dashboard configurations may be provided. Those shown herein are exemplary and used to help understand the comprehensive functionality of the artificial intelligence (AI) based communication system 100 for digital content and transaction It should also be appreciated that the AI-based communications system 100 may also provide other components not shown. These may include gateways, servers, or other interfaces that may perform and run analytics in order to decrease time, expense in data delivery, and perhaps even taking immediate action at equipment. In many ways, the system 100 may then provide real-time or near real-time analytics to simplify the analytics process and increase responsiveness and efficiency.

It should be appreciated that the components of the system 100 described herein may operate in partial or full capacity, or it may be removed entirely. It should also be appreciated that data analytics and processing techniques described below with respect to the analytics system, for example, may also be performed partially or in full by other various components of the overall system.

It should be appreciated that the data stores described herein may include volatile and/or nonvolatile data storage that may store data and software or firmware including machine-readable instructions. The software or firmware may include subroutines or applications that perform the functions of the AI-based communications system 100 and/or run one or more application that utilize data from the AI-based communications system 100. Other various server components or configurations may also be provided.

There may be several examples of hardware that may be used for the servers, layers, subsystems, and components of the analytics system 200 or the AI-based communications system 100. For example, the processor may comprise an integrated circuit, and may execute software or firmware or comprise custom processing circuits, such as an application-specific integrated circuit (ASIC) or field-programmable gate array (FPGA). The data access interface 202 and output interface 221 may be any number of hardware, network, or software interfaces that serves to facilitate communication and exchange of data between any number of or combination of equipment, protocol layers, or applications. For example, the data access interface 202 and output interface 222 may each include a network interface to communicate with other servers, devices, components or network elements via a network in the system 100.

Although applications described herein are directed mainly to prediction of non-fraud disputes in payment transaction processing, it should be appreciated that other systems may also use these and other various techniques in content-based recommendation engines, advertisements, market research, law enforcement, supply chain management and operations, dynamic risk analysis, and other types of knowledge or transaction management systems. The AI-based communications systems described herein may provide a more comprehensive, flexible and efficient approach to providing enhanced user experience and service using AI-based techniques.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
one or more data stores to store and manage data within a network;
one or more servers to facilitate operations using information from the one or more data stores;
an artificial intelligence (AI) based communications system that communicates with the one or more servers and the one or more data stores, the artificial intelligence (AI) based communications system comprising:
a data access interface to:
receive historical transaction and disputes data from at least one data source associated with an account issuer, wherein the account issuer is a financial institution, and wherein the historical transaction and disputes data are comprised of feature vectors for building and validating one or more boosted decision trees in the artificial intelligence (AI) based communication system, wherein the feature vectors are representative of features of a transaction associated with multimodal data;
receive incoming transaction data associated with a transaction from at least one data source associated with an account holder, wherein the account holder has an account with the financial institution;
a processor to:
generate a prediction for a likelihood of a non-fraud dispute associated with the transaction associated with the account holder by:
examining historical transaction and disputes data from the at least one data source associated with an account issuer;
retrieving non-fraud dispute attributes based on the examination of historical transaction and disputes data, wherein the non-fraud dispute attributes include non-fraud dispute categories derived from the historical transaction and disputes data, and the non-fraud dispute categories include duplicate processing, credit not processed, paid by other means, defective merchandise, delayed service, and misrepresented merchandise or service;
training the one or more boosted decision trees with training data labeled with the non-fraud dispute categories;
parsing the incoming transaction data from the at least one data source associated with an account holder;
applying predictive analytics to the incoming transaction data from the at least one data source associated with an account holder based at least on the historical transaction and disputes data and the non-fraud dispute attributes;

determining one of the non-fraud dispute categories for the transaction and a prediction value for the one of the non-fraud dispute categories from the applying of the predictive analytics;

determining that the prediction value meets a predetermined threshold; and generating the prediction for the likelihood of a non-fraud dispute associated with the transaction associated with the account holder based on the prediction value and the predetermined threshold, wherein the prediction includes the one of the non-fraud dispute categories; and an output interface to transmit to a user device the report with the prediction for the likelihood of a non-fraud dispute associated with the transaction associated with the account holder.

2. The system of claim 1, wherein the at least one data source associated with the account holder comprises at least one of an enterprise resource planning (ERP) system, a point of sale (POS) device, a database, a mobile device, a website, a document, and a reporting system.

3. The system of claim 1, wherein the at least one data source associated with the account issuer comprises at least one of a website, a document, an enterprise resource planning (ERP) system, a database, a web feed, a sensor, a geolocation data source, a server, an analytics tool, a mobile device, and a reporting system.

4. The system of claim 1, wherein the one or more boosted decision trees is built and trained by the artificial intelligence (AI) based communications system to identify and determine one or more attributes of a transaction to find similarities using a matching technique, wherein the attributes comprise high-level abstractions represented by vectors of numeric values that includes feature vectors and associated text, audio, or multimodal data.

5. The system of claim 1, wherein the predictive analytics applied to the incoming transaction data comprises at least one of pattern recognition, forecasting, simulation, modeling, natural language processing (NLP), multi-lingual support, image processing and recognition, knowledge graph, intellective computing, synoptic evaluation, and decision tree.

6. The system of claim 1, wherein the prediction value is based on binarized classification modeling.

7. The system of claim 1, wherein the processor comprises:

generating an alert notification to inform at least one of the account issuer and the account holder of the likelihood of a non-fraud dispute associated with the transaction associated with the account holder.

8. A method for predicting a non-fraud dispute, comprising:

receiving, at a data access interface, historical transaction and disputes data from at least one data source associated with an account issuer, wherein the account issuer is a financial institution, and wherein the historical transaction and disputes data are comprised of feature vectors useful for building and validating one or more boosted decision trees in the artificial intelligence (AI) based communication system, wherein the feature vectors are representative of features of a transaction associated with multimodal data;

receiving incoming transaction data associated with a transaction from at least one data source associated with an account holder, wherein the account holder has an account with the financial institution;

generating, at a processor, a prediction for a likelihood of a non-fraud dispute associated with the transaction associated with the account holder by:

examining historical transaction and disputes data from the at least one data source associated with an account issuer;

retrieving non-fraud dispute attributes based on the examination of historical transaction and disputes data, wherein the non-fraud dispute attributes include non-fraud dispute categories derived from the historical transaction and disputes data, and the non-fraud dispute categories include duplicate processing, credit not processed, paid by other means, defective merchandise, delayed service, and misrepresented merchandise or service;

training the one or more boosted decision trees with training data labeled with the non-fraud dispute categories;

parsing the incoming transaction data from the at least one data source associated with an account holder;

applying predictive analytics to the incoming transaction data from the at least one data source associated with an account holder based at least on the historical transaction and disputes data and the non-fraud dispute attributes;

determining one of the non-fraud dispute categories for the transaction and a prediction value for the one of the non-fraud dispute categories from the applying of the predictive analytics;

determining that the prediction value meets a predetermined threshold; and generating the prediction for the likelihood of a non-fraud dispute associated with the transaction associated with the account holder based on the prediction value and the predetermined threshold, wherein the prediction includes the one of the non-fraud dispute categories; and outputting, at an output interface, to a user device the report with the prediction for the likelihood of a non-fraud dispute associated with the transaction associated with the account holder.

9. The method of claim 8, wherein the at least one data source associated with the account holder comprises at least one of an enterprise resource planning (ERP) system, a point of sale (POS) device, a database, a mobile device, a website, a document, and a reporting system.

10. The method of claim 8, wherein the at least one data source associated with the account issuer comprises at least one of a website, a document, an enterprise resource planning (ERP) system, a database, a web feed, a sensor, a geolocation data source, a server, an analytics tool, a mobile device, and a reporting system.

11. The method of claim 8, wherein the one or more boosted decision trees is built and trained by the artificial intelligence (AI) based communications system to identify and determine one or more attributes of a transaction to find similarities using a matching technique, wherein the attributes comprise high-level abstractions represented by vectors of numeric values that includes feature vectors and associated text, audio, or multimodal data.

12. The method of claim 8, wherein the predictive analytics applied to the incoming transaction data comprises at least one of pattern recognition, forecasting, simulation, modeling, natural language processing (NLP), multi-lingual support, image processing and recognition, knowledge graph, intellective computing, synoptic evaluation, and decision tree.

13. The method of claim 8, wherein the prediction value is based on binarized classification modeling.

14. The method of claim 8, comprising:
generating an alert notification to inform at least one of the account issuer and the account holder of the likelihood of a non-fraud dispute associated with the transaction associated with the account holder.

15. The method of claim 8, comprising:
generating a recommended action to a user device based on the likelihood of a non-fraud dispute associated with the transaction associated with the account holder.

16. A non-transitory computer-readable storage medium having an executable stored thereon, which when executed instructs a processor to perform the method of claim 8.

* * * * *

UNITED STATES PATENT AND TRADEMARK OFFICE
CERTIFICATE OF CORRECTION

PATENT NO. : 11,475,456 B2  
APPLICATION NO. : 16/167111  
DATED : October 18, 2022  
INVENTOR(S) : Ramakrishnan Ponniah et al.

Page 1 of 1

It is certified that error appears in the above-identified patent and that said Letters Patent is hereby corrected as shown below:

On the Title Page

Item (73), Assignee name is listed as "ACCENTURE GLOBAL SOLUTIOS LIMITED" should instead read "ACCENTURE GLOBAL SOLUTIONS LIMITED".

Signed and Sealed this  
Ninth Day of July, 2024

Katherine Kelly Vidal  
*Director of the United States Patent and Trademark Office*